(12) United States Patent
Rodgers et al.

(10) Patent No.: US 7,226,540 B2
(45) Date of Patent: *Jun. 5, 2007

(54) MEMS FILTER MODULE

(75) Inventors: M. Steven Rodgers, Albuquerque, NM (US); Jeffry J. Sniegowski, Tijeras, NM (US); Paul J. McWhorter, Albuquerque, NM (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 325 days.

This patent is subject to a terminal disclaimer.

(21) Appl. No.: 10/911,424

(22) Filed: Aug. 4, 2004

(65) Prior Publication Data

US 2005/0184003 A1 Aug. 25, 2005

Related U.S. Application Data

(60) Provisional application No. 60/547,252, filed on Feb. 24, 2004.

(51) Int. Cl.
*B01D 63/08* (2006.01)
*A61M 5/165* (2006.01)
*A61M 37/00* (2006.01)
*B01D 63/00* (2006.01)

(52) U.S. Cl. ............ 210/321.84; 210/511; 210/321.75; 210/500.22; 210/500.26; 422/101; 604/6.09; 604/8

(58) Field of Classification Search ...................... None
See application file for complete search history.

(56) References Cited

U.S. PATENT DOCUMENTS

| | | | |
|---|---|---|---|
| 3,788,327 A | 1/1974 | Donowitz et al. | 128/350 R |
| 4,457,757 A | 7/1984 | Molteno | 604/294 |
| 4,750,901 A | 6/1988 | Molteno | 604/8 |
| 4,797,211 A | 1/1989 | Ehrfeld et al. | 210/321.84 |
| 5,380,328 A * | 1/1995 | Morgan | 606/70 |
| 5,411,473 A | 5/1995 | Ahmed | 604/8 |

(Continued)

OTHER PUBLICATIONS

Peterson, K., McMillan, W., Kovacs, G., Northrup, A., Pourahmadi, F. *IVD Technology*, "The Promise of Miniaturized Clinical Diagnostic Systems", [online] Jul. 1998. [Retrieved on Jun. 17, 2004 from the internet: <URL: http://www.devicelink.com/ivdt/archive/98/07/009.html>].

(Continued)

*Primary Examiner*—Krishnan S. Menon
(74) *Attorney, Agent, or Firm*—James J. Murtha

(57) ABSTRACT

Various MEMS filter elements or modules are disclosed. One such MEMS filter module (34) includes a first film (70) and a second film (46) that are spaced and interconnected by a plurality of supports (78). A plurality of first flow ports (74) extend through the first film (70), and a plurality of second flow ports (50) extend through the second film (46). A plurality of annular filter walls (54) extend from the second film (46) toward the first film (70), and are separated therefrom by a filter trap gap (58). A filter trap chamber (62) is disposed on each side of each filter trap gap (58). Therefore, fluid will flow into one filter trap chamber (62), through a filter trap gap (58), and into another filter trap chamber (62), whether the flow is introduced into the filter module (34) through the first flow ports (74) or the second flow ports (50).

47 Claims, 32 Drawing Sheets

U.S. PATENT DOCUMENTS

| | | | | |
|---|---|---|---|---|
| 5,454,796 A | | 10/1995 | Krupin | 604/294 |
| 5,496,372 A | * | 3/1996 | Hamamoto et al. | 623/23.54 |
| 5,651,900 A | | 7/1997 | Keller et al. | 216/56 |
| 5,743,868 A | | 4/1998 | Brown et al. | 604/8 |
| 5,753,014 A | | 5/1998 | Van Rijn | 96/12 |
| 5,807,302 A | | 9/1998 | Wandel | 604/8 |
| 5,807,406 A | * | 9/1998 | Brauker et al. | 424/423 |
| 5,893,974 A | | 4/1999 | Keller et al. | 210/483 |
| 5,919,364 A | | 7/1999 | Lebouitz et al. | 210/321.84 |
| 5,922,210 A | | 7/1999 | Brody et al. | 210/767 |
| 6,044,981 A | | 4/2000 | Chu et al. | 210/490 |
| 6,082,208 A | | 7/2000 | Rodgers et al. | 74/406 |
| 6,497,821 B1 | | 12/2002 | Bellamy et al. | 210/651 |
| 6,613,241 B1 | | 9/2003 | Scherer et al. | 216/52 |
| 6,913,697 B2 | * | 7/2005 | Lopez et al. | 210/644 |
| 2003/0212383 A1 | | 11/2003 | Cote et al. | 604/523 |
| 2005/0133436 A1 | * | 6/2005 | Kneezel | 210/321.84 |

OTHER PUBLICATIONS

Brody, J., Osborn, T., Forster F., and Yager, P., "A Planar Microfabricated Fluid Filter", University of Washington, Seattle, WA, [online] cited as a 1996 publication at faculty. Washington. edu.yagerp/microfluidstutorial/hfilter/hfilterhome.htm [Retrieved on Jun. 17, 2004 from the internet: <URL: http://brodylab.eng.uci.edu/~jpbrody/filter-paper.pdf].

U.S. Appl. No. 10/791,396, filed Mar. 2, 2004, Sniegowski et al.

Ayyala, R. and Hong, C., "Glaucoma, Drainage Devices" [online], cites a "Last Updated" of Mar. 11, 2002 [Retrieved on Jun. 17, 2004 from the internet: <URL://www.emedicine.com/oph/topic754htm>].

* cited by examiner

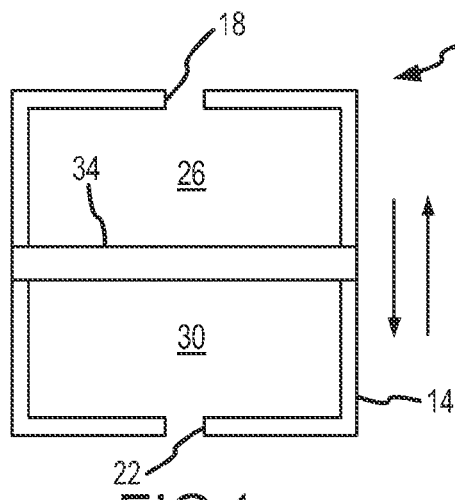
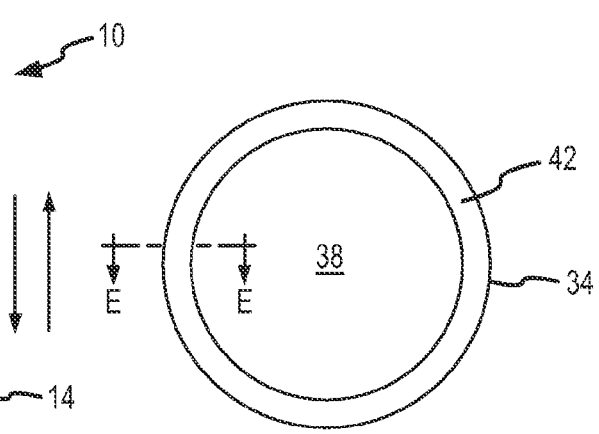
FIG.1      FIG.2A
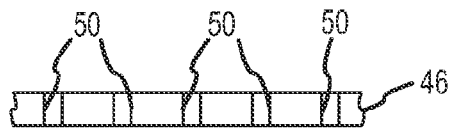
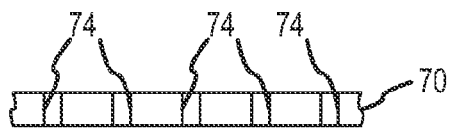
FIG.2B      FIG.2C
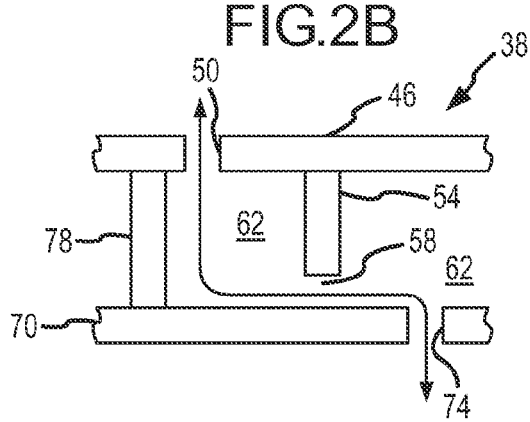
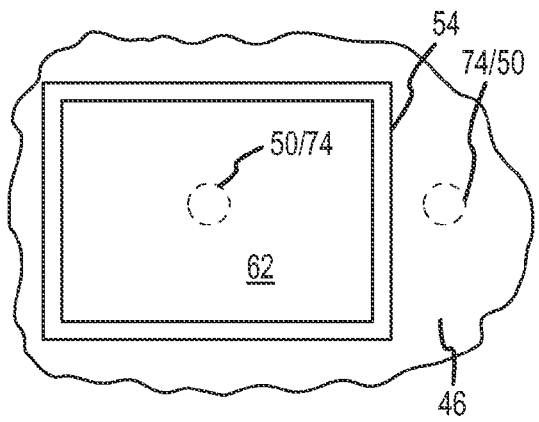
FIG.2D      FIG.2E
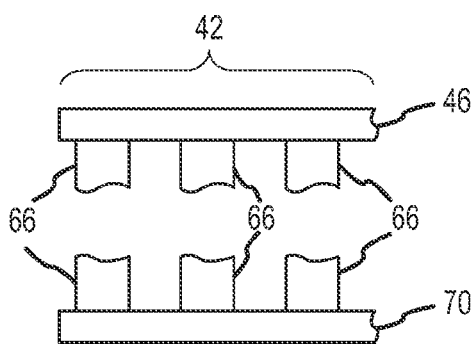
FIG.2F

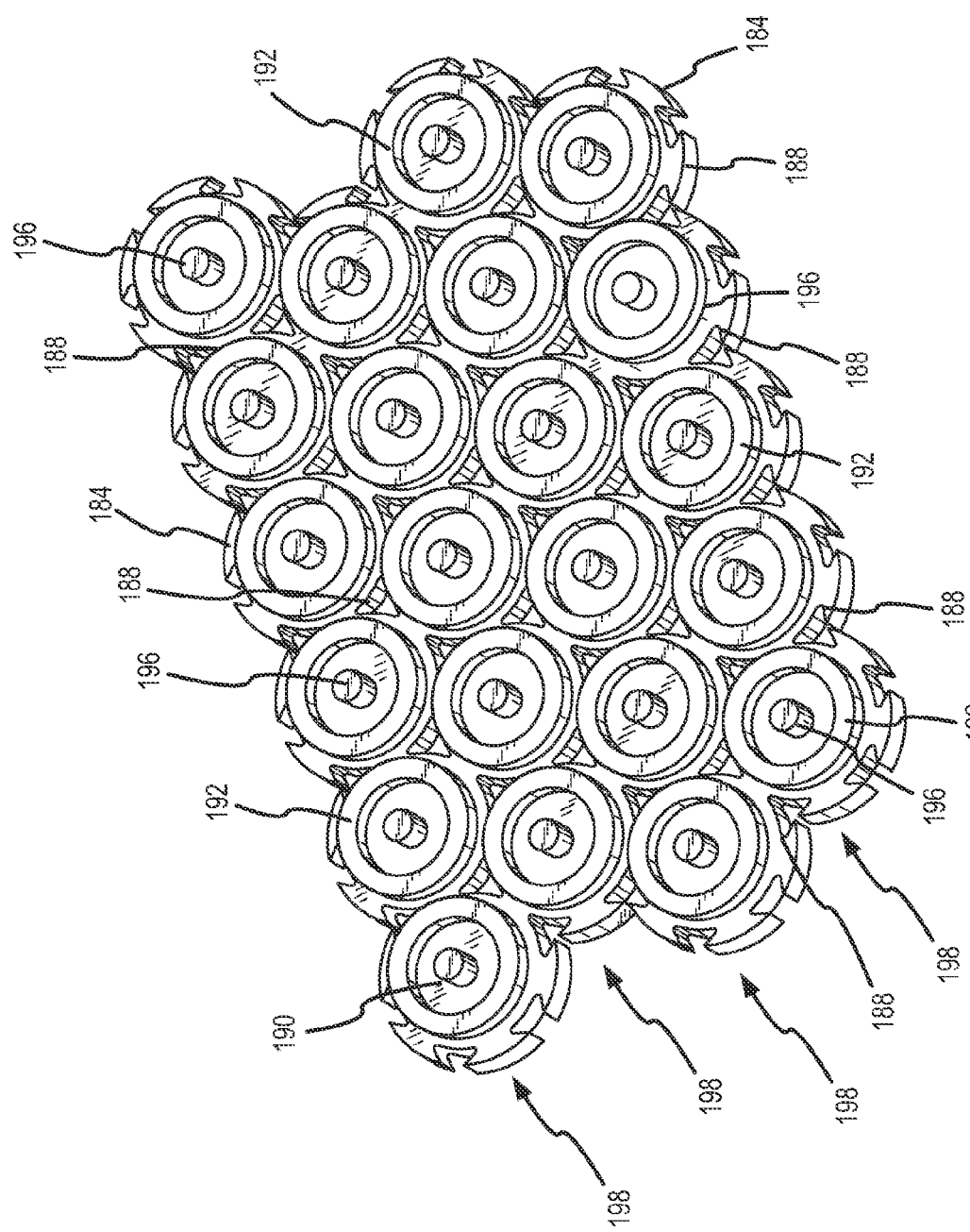

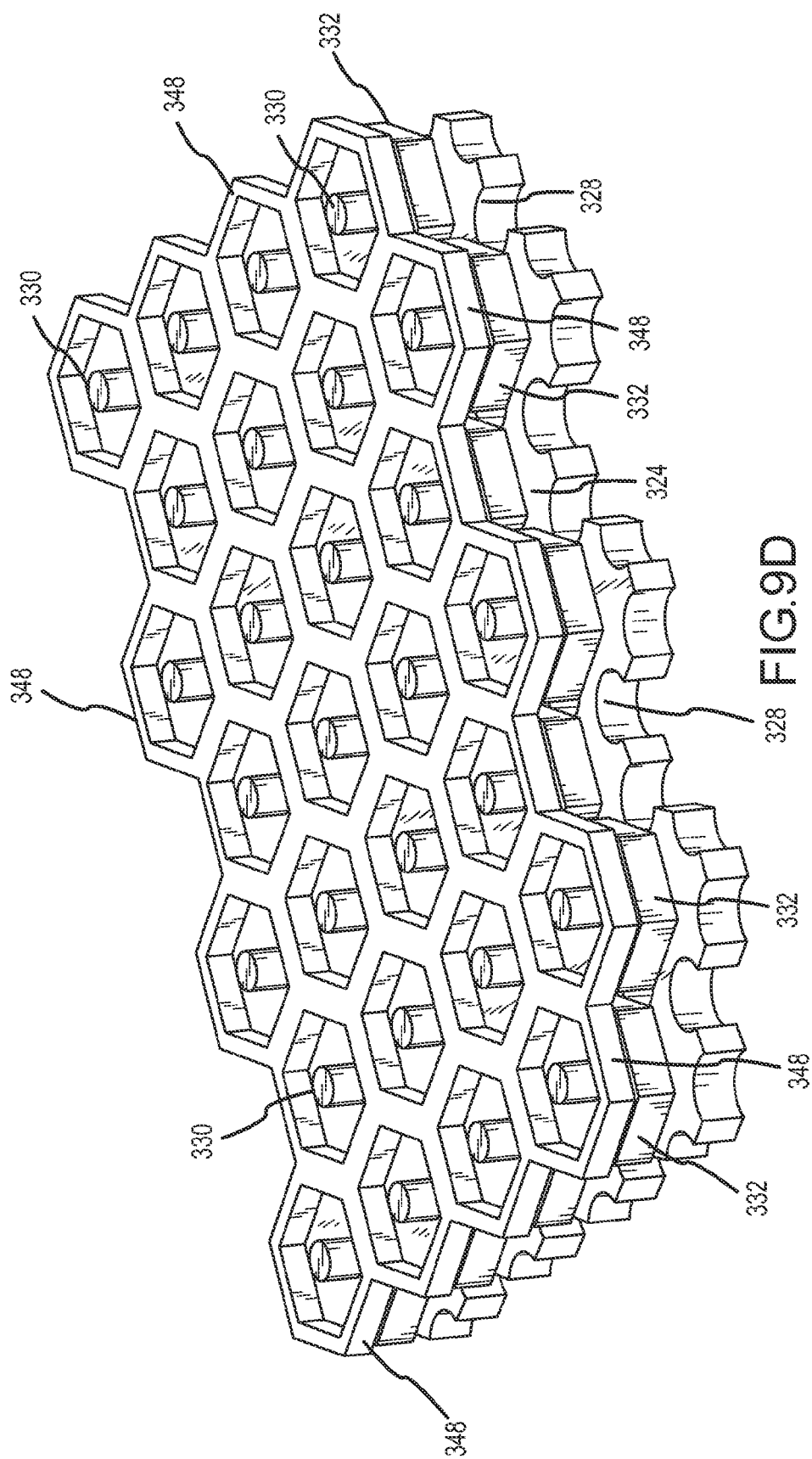

MEMS FILTER MODULE

CROSS REFERENCE TO RELATED APPLICATIONS

This patent application claims priority under 35 U.S.C. §119 to U.S. Provisional Patent Application Ser. No. 60/547,252, that is entitled "MEMS FILTER MODULE," that was filed on Feb. 24, 2004, and the entire disclosure of which is incorporated by reference in its entirety herein.

FIELD OF THE INVENTION

The present invention generally relates to field of filters and, more particularly, to a filter module that is microfabricated using multiple films disposed in spaced relation, where a flow is directed into the module before being directed through a filter trap that is defined by a substantially constant, fixed spacing between one of the films and a filter wall that extends from another of the films.

BACKGROUND OF THE INVENTION

Filters are used in a large number of applications. The filtering media used by a filter may be in the form of a porous material or combination of porous materials. Both the pore size and the distribution of pores may of course have an effect on the filtering capabilities of the filtering media. For instance, if the filtering media is produced in a manner where adjacent pores could overlap, a larger pore may be formed. Although this may be acceptable for certain applications, it may not be for others (e.g., filtering biological fluids).

BRIEF SUMMARY OF THE INVENTION

The present invention generally relates to a MEMS filter module that may be inserted into a flow of any appropriate type and in any appropriate manner (e.g., by disposing the MEMS filter module into a housing through which a flow is directed). Generally, the MEMS filter modules described herein are microfabricated. There are a number of microfabrication technologies that are commonly characterized as "micromachining," including without limitation LIGA (Lithographie, Galvonoformung, Abformung), SLIGA (sacrificial LIGA), bulk micromachining, surface micromachining, micro electrodischarge machining (EDM), laser micromachining, 3-D stereolithography, and other techniques. Hereafter, the term "MEMS filter module" or the like means any such filtering device that is fabricated using a technology that allows realization of a feature size of about 10 microns or less.

One filter module in accordance with the present invention generally includes a first plate or film having a plurality of first flow ports that extend through its entire vertical extent or thickness, as well as a second plate or film that is spaced (e.g., vertically, such as when the filter module is in a first orientation) from this first film and that has a plurality of second flow ports that extend through its entire vertical extent or thickness. A plurality of filter walls are spaced on and extend from the second film in the direction of the first film. A gap between each filter wall and the first film defines a filter trap, such that there are then a plurality of filter traps. A first annular seal extends between the first and second films such that the first film, the second film, and the first annular seal collectively define an enclosed space. The region bounded by this first annular seal may be characterized as a filtering region. All of the filter walls, filter traps, first flow ports, and second flow ports are located in this filtering region. A plurality of posts or other supports extend between and interconnect the first and second films in the filtering region as well.

A first aspect is directed to the above-noted type of MEMS filter module, where each of the filter walls have an annular extent in a plan view of the surface of the second film from which the plurality of filter walls extend. "Annular" in relation to the first aspect means that that each filter wall is defined by a closed perimeter, and does not limit the filter wall to a "circular" configuration in the noted plan view. A second aspect is directed to the above-noted type of MEMS filter module, where the number of supports in the filtering region is no less than the number of filter walls. Stated another way, there are at least as many supports in the filtering region as there are filter walls. A third aspect is directed to the above-noted type of MEMS filter module, where there are at least two first flow ports (the first film) and at least two second flow ports (the second film) associated with each filter trap. Therefore, any "plugging" of a particular first flow port or a second flow port should not totally disable its corresponding filter trap.

Various refinements exist of the features noted in relation to the MEMS filter module associated with any of the first through the third aspects of the present invention. Further features may also be incorporated in the MEMS filter module associated with any of the first through the third aspects of the present invention as well. These refinements and additional features may exist individually or in any combination. Initially, the above-noted first, second, and third aspects may be used individually or in any combination. The MEMS filter module may be of any appropriate configuration, may be adapted for use in any appropriate filter housing or structure for receiving the same, may be used to filter any appropriate fluid, may be used to filter any appropriate flow, and may be used for any appropriate application. Although the MEMS filter module will typically be separately fabricated from the filter housing and separately mounted thereto in any appropriate manner, the present invention is not limited to such a configuration.

Both the first film and the second film of the MEMS filter module associated with any of the first through the third aspects may have a maximum thickness of about 10 microns, and more typically within the range of about 1 micron to about 3 microns. Any appropriate material may be used for the first and second films. Although any appropriate microfabrication technique may be used in relation to this MEMS filter module, surface micromachining is a preferred approach, using materials such as polysilicon, silicon carbide, silicon nitride, polysilicon germanium, and tungsten for the first and second films, as well as for the filter wall. Typically the first and second films and the filter wall(s) will all be fabricated from the same material. The MEMS filter module also will typically be separated from any substrate that is used in the fabrication of the MEMS filter module prior to using the same in a filtering application (e.g., prior to disposing the same in the relevant filter housing or other structure for receiving the MEMS filter module).

The first and second films used by the MEMS filter module of any of the first through the third aspects may define its upper and lower boundaries or opposing extremes for the MEMS filter module. The first and/or second films each could also be an "intermediate" film in the MEMS filter module. One embodiment has a lower film that is vertically spaced from the first film on the opposite side thereof in relation to the second film. That is, the first film is located at an intermediate elevation between the second film and the lower film. This lower film may include a plurality of flow ports extending therethrough as well.

The filter walls used by the MEMS module of any of the first through the third aspects may be of an annular configuration or have a closed perimeter. Representative annular configurations for the filter walls include without limitation circular, square, and rectangular. In the case where the filter walls are annular, the corresponding filter trap will thereby also be annular. This may be of benefit for maintaining a desired flow rate through the MEMS filter module. Filter wall configurations other than annular may be used in relation to the above-noted second and third aspects as well. In one embodiment, each filter wall extends from the second film and terminates prior to reaching the surface of the first film that faces the surface of the second film from which the filter walls extend. In this case, each filter trap gap is defined by a distal end of a filter wall and the surface of the first film that faces the surface of the second film from which the filter walls extend. In another embodiment, an area encompassed by projecting each of the filter walls onto the first film does not encompass any of the first flow ports (e.g., each of the first flow ports are offset from each of the filter walls).

The filter traps associated with the MEMS filter module of any of the first through the third aspects are each defined by a space between the first film and each of the various filter walls that extend from the second film. Preferably the filter traps are defined by the space between the distal end of each of the filter walls and the first film. That is, in this particular instance the filter walls do not extend all the way to the first film. In one embodiment, the height of this gap is about 0.3 microns. Any appropriate gap size may be utilized.

The "density" of the supports that interconnect the first and second films throughout the filtering region may be selected to provide a desired degree of rigidity in relation to the anticipated flow rate(s) through the MEMS filter module of any of the first through the third aspects, may be selected to precisely maintain the magnitude of each filter trap throughout the filtering region for the anticipated flow rate(s) through the MEMS filter module of any of the first through the third aspects, or both. The second aspect again provides that there is at least one such support in the filtering region for each filter wall. In one embodiment, the maximum spacing between adjacent pairs of supports in the filtering region is no more than 100 microns, and may be on the order of 10 microns to about 20 microns.

Multiple filter trap chambers may be associated with each filter trap of the MEMS filter module of any of the first through the third aspects. Each such filter trap chamber may be defined by the space between the first and second films. A first filter trap chamber may be the space "bounded" by each annular filter wall, and a second filter trap chamber may be the space between the various annular filter walls. The volume of each first filter trap chamber and the volume of the second filter trap chamber may be larger than the volume of any first flow port or any second flow port, although such need not be the case. In any case, the flow path through the MEMS filter module will either be into a first filter trap chamber, through the associated filter trap, and then into the second filter trap chamber, or the reverse.

More than one annular seal may be provided between the first and second films in the case of the MEMS filter module of any of the first through the third aspects. For instance, a second annular seal may be spaced outwardly from the first annular seal, and may extend between and interconnect the first and second films as well. A third annular seal may be spaced outwardly from the second annular seal, and may extend between and interconnect the first and second films as well. Using multiple annular seals reduces the potential for undesirable leakage out of the filtering region. Stated another way, multiple annular seals increase the likelihood that all flow through the MEMS filter module will be directed through the various filter traps. In one embodiment, the width of a perimeter region having at least one annular seal is at least about 3 microns to about 4 microns, and may be on the order of about 20 microns to about 25 microns.

A fourth aspect of the present invention is generally directed to a MEMS filter module having a first film having a plurality of first flow ports. A first chamber is fluidly connected with at least one of the first flow ports. A second film is spaced (e.g., vertically, when the MEMS filter module is disposed in a first orientation) from the first film and includes a plurality of second flow parts, and a second chamber is fluidly connected with at least one of the second flow parts. A first filter wall extends from the second film in the direction of the first film, and a first filter trap is defined in part by this first filter wall. The first and second chambers are fluidly connected by the filter trap gap.

Various refinements exist of the features noted in relation to the MEMS filter module of the fourth aspect. Further features may also be incorporated into the MEMS filter module of the fourth aspect as well. These refinements and additional features may exist individually or in any combination. Initially the various features discussed above in relation to the first through the third aspects may be used by this fourth aspect, individually or in any combination.

The first and second films may define the extremes of the MEMS filter in the case of the fourth aspect. One or both of the first and second films also may be disposed at an intermediate location or elevation within the MEMS filter module. In one embodiment, the filter trap gap is defined between the first filter wall and the first film. In another embodiment, at least one intermediate film section is disposed at an intermediate location or elevation between the first and second films and is interconnected with each by an appropriate support. Here the filter trap gap is defined between the first filter wall and the intermediate film section. In the case where a plurality of filter walls are utilized, there will be a corresponding number of intermediate film sections. An annular gap may exist around the perimeter of each such intermediate film section to fluidly communicate with the lower flow ports in the lower film.

A fifth aspect of the present invention is directed to a method for fabricating a MEMS filter module. A first film is formed in overlying relation to a substrate. A first flow aperture is formed down through the entire vertical extent of the first film. A first sacrificial film is formed directly on the upper surface of the first film and will typically fill the first flow port aperture. A filter wall aperture is formed down through the entire vertical extent of the first sacrificial film, and thereby exposes a corresponding portion of the first film. Additional sacrificial material is thereafter deposited at least on the portion of the first film that is exposed by the filter wall aperture (i.e., on the "bottom" of the filter wall aperture, that is defined by the first film), and typically on the entire upper surface of the first sacrificial film. This subsequent deposition of sacrificial material may still be viewed as being part of the first sacrificial film. In any case, a second film is formed on the first sacrificial film and extends within the filter wall aperture to define a filter wall that extends toward, but not to (because of the sacrificial material that was previously deposited in the filter wall aperture), the first film. A second flow port aperture is formed down through the entire vertical extent of the second film. Once the first sacrificial layer is removed, the gap between the filter wall and the first film defines a filter trap.

Various refinements exist of the features noted in relation to the fifth aspect of the present invention. Further features may also be incorporated in the fifth aspect of the present invention as well. These refinements and additional features may exist individually or in any combination. One benefit of this fifth aspect is the accuracy with which the sacrificial material may be deposited in the filter wall aperture, more specifically the thickness of this sacrificial material. As such, the size of the filter trap gap(s) may be precisely controlled. In one embodiment, the thickness of the sacrificial material deposited in the filter wall aperture varies by no more than about 2% from the target thickness.

Although any fabrication technique may be used in relation to the fifth aspect, surface micromachining is preferred. Typically the first film will be separated from the substrate by an intermediate sacrificial layer. This would allow the MEMS filter module to be separated from the substrate after the MEMS filter module is released (e.g., by etching away sacrificial material). For instance, the MEMS filter module may remain supported above the substrate after any such release by one or more structural interconnections. Any such structural interconnections may be disabled (electrically/thermally and/or mechanically fractured), at which time the MEMS filter module may drop onto the underlying substrate (or any film(s) formed directly on the substrate). Preferably, one or more structures are formed on the substrate about the MEMS filter module to thereafter limit lateral movement of the MEMS filter module relative to the substrate until it is retrieved from the substrate. Another option would be to fabricate the MEMS filter module on a layer of a sacrificial material and not structurally interconnect the MEMS filter module with the underlying substrate. In this case, the removal of the sacrificial material will separate the MEMS filter module from the substrate.

A sixth aspect of the present invention is directed to a method for fabricating a MEMS filter module using a substrate. A first sacrificial film is formed on (directly or indirectly) the substrate, and the MEMS filter module is thereafter fabricated by forming a plurality of sacrificial and structural films. A plurality of structural interconnections are provided between the MEMS filter module and the substrate. The first sacrificial film is removed such that the filter module is suspended above the substrate by the structural interconnections. Each of the structural interconnections is then disabled to allow the MEMS filter module to drop or fall onto the underlying substrate or a film formed directly on the substrate.

Various refinements exist of the features noted in relation to the sixth aspect of the present invention. Further features may also be incorporated in the sixth aspect of the present invention as well. These refinements and additional features may exist individually or in any combination. Any appropriate way of disabling the structural interconnections between the MEMS filter module the substrate may be utilized. In one instance, an electrical signal is applied to each structural interconnection to at least thermally degrade the same. Another option is to apply a mechanical force to the MEMS filter module (e.g., in the direction of the underlying substrate) to mechanically fracture the various structural interconnections. In any case, one or more structures may be formed on the substrate MEMS filter module to limit lateral movement of the MEMS filter module once the substrate after the various structural interconnections have been disabled or terminated.

BRIEF DESCRIPTION OF THE SEVERAL VIEWS OF THE DRAWING

FIG. 1 is a side view schematic of one embodiment of a filter that uses a MEMS filter module.

FIG. 2A is a top view of the MEMS filter module used by the filter of FIG. 1, illustrating its filtering and perimeter regions.

FIG. 2B is a cutaway, side view of one embodiment of an upper film for the MEMS filter module of FIG. 2A, where this upper film includes a plurality of flow ports for accommodating a flow into/out of the MEMS filter module.

FIG. 2C is a cutaway, side view of one embodiment of a lower film for the MEMS filter module of FIG. 2A, where this lower film includes a plurality of flow ports for accommodating a flow into/out of the MEMS filter module.

FIG. 2D is a cutaway side view of one embodiment of a filter trap that may be used in the filtering region of the MEMS filter module of FIG. 2A.

FIG. 2E is a bottom, plan view of one embodiment of a filter wall that may be used by the filter trap of FIG. 2D.

FIG. 2F is a cross-sectional view taken along line E—E of the MEMS filter module of FIG. 2A, illustrating one embodiment of the perimeter region for the MEMS filter module.

FIG. 5D is a perspective, bottom view of part of the upper film of the filtering region configuration of FIG. 5A, illustrating the filter walls and supports extending therefrom.

FIG. 9D is a perspective view of the filter walls positioned above the second film sections illustrated in FIG. 9B, as well as the upper supports used by the filtering region configuration of FIG. 9A.

DETAILED DESCRIPTION OF THE INVENTION

Figure 3A:
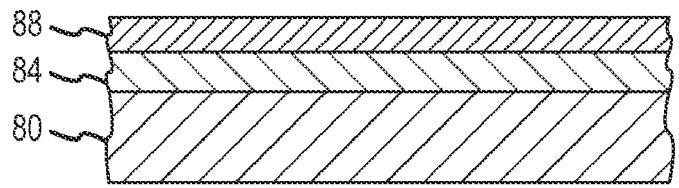
FIGS. 3A–I illustrate one fabrication technique for defining a filter trap from a first film and a filter wall that extends from a second film that is spaced from the first film.

The present invention will now be described in relation to the accompanying drawings that at least assist in illustrating its various pertinent features. FIG. 1 illustrates one embodiment of a filter 10 that utilizes a MEMS filter module 34 formed from a plurality of spaced plates or films maintained in fixed relation to each other. These "films" will typically have a thickness or vertical extent of no more than about 10 microns, and more typically a thickness within a range of about 1 micron to about 3 microns. In any case, the MEMS filter module 34 is preferably removably disposed in a filter housing 14, and separates the housing 14 into an upper chamber 26 and a lower chamber 30. At least one upper flow port 18 extends through the filter housing 14 at a location so as to fluidly communicate with the upper chamber 26. Similarly, at least one lower flow port 22 extends through the filter housing 14 at a location so as to fluidly communicate with the lower chamber 30. The flow may be directed through the filter housing 14 in any direction, as indicated by the arrows in FIG. 1.

The filter housing 14 may be of any appropriate configuration, may be formed from any appropriate material, may be used for any appropriate application, and may receive/engage the MEMS filter module 34 in any appropriate manner (preferably such that all flow through the filter 10 is required to be directed through the MEMS filter module 34). Any number of flow ports 18, 22 may be associated with the upper chamber 26 and lower chamber 30, respectively, and these flow ports 18, 22 may be of any appropriate size and/or shape. The upper chamber 26 and lower chamber 30 each may be of any appropriate size and/or configuration as well, so long as the upper chamber 26 and lower chamber 30 of the filter 10 provide an appropriate flow path to/from the MEMS filter module 34.

The filter 10 may be used for any appropriate application. The "flow" through the filter 10 may be of any appropriate type (e.g. continuous, intermittent) and may be of any appropriate fluid. At least some type of force will typically be exerted on a fluid to provide the flow through the filter 10. This force may be from any appropriate source, such as a pressure source (e.g., a pump), gravity, or a combination thereof. In any case, the filter 10 attempts to remove at least something from the fluid. The filter 10 could be used such that the fluid output from the filter 10 is used for some desired purpose, such that the material retained within the filter 10 is used for some desired purpose, or a combination thereof.

Certain details regarding the MEMS filter module 34 are illustrated in FIGS. 2A–F. There are two prime areas or regions of the MEMS filter module 34, namely a filtering region 38 and a perimeter region 42. At least two spaced films or plates are used by the MEMS filter module 34 in both the filtering region 38 and the perimeter region 42. As will be discussed in more detail below, microfabrication techniques are preferably utilized to fabricate the MEMS filter module 34 on an appropriate substrate (e.g., a wafer). Notably in this regard, the MEMS filter module 34 is separated from the substrate prior to installation in the filter housing 14.

The MEMS filter module 34 includes a first plate or film 70 and a second plate or film 46 that are disposed in spaced relation or at different elevations in the MEMS filter module 34. Each of these films 70, 46 may define an extreme of the MEMS filter module 34 (e.g., may define the lower or upper extent of the MEMS filter module 34) or may be disposed at an intermediate location within the MEMS filter module 34 (e.g., "sandwiched" between two spaced films, and disposed in spaced relation to each of these films). That is, the first film 70 could be a lower extreme of the MEMS filter module 34 or could be at an intermediate location between the upper and lower extremes of the MEMS filter module 34. Similarly, the second film 46 could be an upper extreme of the MEMS filter module 34 or could be at an intermediate location between the upper and lower extremes of the MEMS filter module 34. In any case, the first film 70 includes a plurality of first flow ports 74, while the second film 46 includes a plurality of second flow ports 50. All of the first flow ports 74 and all of the second flow ports 50 are located in the filtering region 38 of the MEMS filter module 34 (i.e., not in the perimeter region 42).

At least one support 78 (e.g., a post or column) extends between and structurally interconnects the first film 70 and the second film 46 in the filtering region 38 of the MEMS filter module 34. Preferably a plurality of such supports 78 are distributed throughout the filtering region 38 in a repeating pattern and in spaced relation to each other. The supports 78 in the filtering region 38 may be of any appropriate size and/or configuration. At least one filter wall 54 is attached to and extends from the second film 46 and at least toward (in the direction of) the first film 74. Each such filter wall 54 terminates prior to reaching the primary surface of the first film 70 that faces the second film 46. Stated another way, each filter wall 54 is shorter than the gap between the first film 70 and the second film 46. In addition, each filter wall 54 is offset from each of the plurality of first flow ports 74. That is, an area defined by projecting the various filter walls 54 onto the primary surface of the first film 70 that faces the second film 46 does not encompass any of the first flow ports 74.

Any number of filter walls 54 may be utilized in the filtering region 38. Although any number of supports 78 may be utilized in the filtering region 38 as well, the number and location of the supports 78 is subject to a number of characterizations for the filtering region 38. One is that each filter wall 54 preferably has at least one support 78 associated therewith. Another is that there are at least as many supports 78 as there are filter walls 54. Another is that the maximum spacing between each pair of adjacent supports 78 is no more than about 100 microns in one embodiment, and more typically within a range of about 10 microns to about 20 microns in another embodiment.

Each filter wall 54 of the MEMS filter module 34 preferably has an annular configuration. "Annular" in this context means that the filter wall 54 has a closed perimeter when looking at the distal end of the filter wall 54 (that which is opposite the end of the filter wall 54 that interfaces with the second film 46). Stated another way, each filter wall 54 extends a full 360 degrees about a certain reference axis along any appropriate path. Any configuration may be utilized to realize the desired annular extent for the filter wall 54 (e.g., circular, oval, square, rectangular). Each filter wall 54 also does not extend all the way to the first film 70 as noted. Instead, a filter trap or a filter trap gap 58 exists between the distal end of each filter wall 54 and the first film 70. Since each filter wall 54 is annular in the preferred configuration, each filter trap gap 58 will similarly be annular. Therefore, any constituent that is "trapped" by being unable to pass through a particular filter trap gap 58 will then not totally "plug" this filter trap gap 58. Having an annular filter trap gap 58 associated with each filter wall 54 also provides a desired flow rate through the MEMS filter module 34.

The flow may enter the MEMS filter module 34 either through the second flow ports 50 (in which case the flow out of the MEMS filter module 34 would be through the first flow ports 74), or through the first flow ports 74 (in which case the flow out of the MEMS filter module 34 would be through the second flow ports 50). In either case, the flow will be directed into a space 62 that extends from the first film 70 to the second film 46 before attempting to pass through a filter trap gap 58 associated with a particular filter wall 54. Each of these spaces 62 in the filtering region 38 may be characterized as a filter trap chamber 62. The height of each filter trap chamber 62 corresponds with the spacing between the first film 70 and the second film 46, which is greater than the height of the filter trap gap 58. The volume of each filter trap chamber 62 may be larger than the volume of any associated first flow port 70, and further may be larger than the volume of any associated second flow port 50, although such is not a requirement. Whether the flow enters the MEMS filter module 34 through the first flow ports 74 or the second flow ports 50, the flow will go through a filter trap chamber 62, then through a filter trap gap 58, and then through another filter trap chamber 62. Although each filter trap chamber 62 could be of the same configuration and volume, in one embodiment there are two distinct groups of filter trap chambers 62 that differ from each other in at least some respect (e.g., different volumes/configurations).

As noted above, the flow may be directed through the filter 10 in any direction. One or more first flow ports 74 may be disposed inwardly of each filter wall 54 (so as to fluidly interconnect with a filter trap chamber 62 bounded by a single filter wall 54), while one or more second flow ports 50 may be disposed beyond the perimeter of each filter wall 54 (so as to fluidly interconnect with a filter trap chamber 62 defined by the spacing between multiple filter walls 54) (FIG. 2E). Conversely, one or more second flow ports 50 may be disposed inwardly of each filter wall 54 (so as to fluidly interconnect with a filter trap chamber 62 bounded by a single filter wall 54), while one or more first flow ports 74 may be disposed beyond the perimeter of the filter wall 54 (so as to fluidly interconnect with a filter trap chamber 62 defined by the spacing between multiple filter walls 54) (FIG. 2E). In any case, flow is required to pass through a filter trap gap 58 defined in part by the filter wall 54 before exiting MEMS filter module 34.

There are a number of characterizations relating to the flow through the MEMS filter module 34. One is that the flow through the MEMS filter module 34 is not axial in that it must undergo at least one change in direction, including without limitation to flow through a filter trap gap 58. Another characterization is that the direction of the flow through the filter trap gap 58 is in a dimension that is at least generally parallel with the first film 70 and second film 46. Another characterization is that the flow through the filter trap gap 58 is at least generally orthogonal to the direction of the flow through both the first film 70 and second film 46.

Flow is directed through the filter trap gap 58 to provide a filtering function. Any constituent in the flow (e.g., particulates, cells of at least a certain size) that is larger than the height of the filter trap gap 58 will typically be collectively retained by the filter wall 54 and the first film 70 (i.e., by being unable to pass through the filter gap 58). The number and location of the various supports 78 is preferably selected such that the height of each filter trap gap 58 throughout the filtering region 38 is maintained within a small tolerance for the maximum flow rates for which the MEMS filter module 34 is designed. In the case where the height of each filter trap gap 58 is about 0.3 microns, supports 78 are distributed throughout the filtering region 38 such that the height of each such filter trap gap 58 will vary by no more than about a few tens of nanometers (e.g., due to a deflection of the first film 70 and/or second film 46) when running the maximum flow rate through the filter 10 for which it was designed.

One or more annular seals 66 are located in the perimeter region 42 of the MEMS filter module 34, and define a boundary or perimeter for the filtering region 38 of the MEMS filter module 34. "Annular" in the context of the annular seal(s) 66 means that the annular seal(s) 66 defines a closed perimeter or boundary for the filtering region 38 of the MEMS filter module 34 in the "lateral" dimension. Stated another way, each seal 66 extends a full 360 degrees about a certain axis. In any case, all first flow ports 74 associated with the first film 70 and all second flow ports 50 associated with the second film 46 are thereby disposed inwardly of each annular seal 60. Any number of annular seals 66 may be utilized (three in the illustrated embodiment), and are preferably concentrically disposed in laterally spaced relation to provide redundant sealing capabilities for the filtering region 38 of the MEMS filter module 34 in the lateral dimension. That is, the annular seals 66 at least attempt to force all of the flow through the filtering region 38 of the MEMS filter module 34. Each of the annular seals 66 may be of the same width, or at least one of the annular seals 66 may be of a different width. In one embodiment, the annular seal 66 that is most outwardly disposed is wider than any other annular seal 66.

Another function of each annular seal 66 used by the MEMS filter module 34 is to provide structural strength or rigidity for the MEMS filter module 34. Each annular seal 66 structurally interconnects the first film 70 with the second film 46 in the perimeter region 42 of the MEMS filter module 34. This may be used for handling/engaging the MEMS filter module 34 in a manner that reduces the potential for damaging the physical structure of the MEMS filter module 34. The perimeter region 42 of the MEMS filter module 34 is preferably more rigid than the filtering region 38 of the MEMS filter module 34. The perimeter region 42 may thereby provide a desired, sufficiently robust interface for engagement with the filter housing 14 or an intermediate sealing structure. The width of the perimeter region 42 is at least about 3 or 4 microns in one embodiment, and may be on the order of about 20 microns to about 25 microns in another embodiment.

Both the first film 70 (having the plurality of first flow ports 74) and the second film 46 (having the plurality of second flow ports 50) are thereby supported about their respective perimeter regions by each annular seal 66. That is, both the first film 70 (having the plurality of first flow ports 74) and the second film 46 (having the plurality of second flow ports 50) are continuous structures throughout the MEMS filter module 34. Stated another way, one may progress along the first film 70 from one location in the perimeter region 42 of the MEMS filter module 34, through the filtering region 38, and to any other location in the perimeter region 42 along a continuous path defined by the first film 70 (albeit possibly along a meandering path). Similarly, one may progress along the second film 46 from one location in the perimeter region 42 of the MEMS filter module 34, through the filtering region 38, and to any other location in the perimeter region 42 along a continuous path defined by the second film 46 (albeit possibly along a meandering path).

The MEMS filter module 34 may be defined by any number of films, may be formed from any appropriate material, may be of any appropriate configuration for the desired application, and may be of any appropriate shape in plan view (FIG. 2A). Preferably, the first film 70, the second film 46, the filter wall(s) 54, the support post(s) 78, and the annular seal(s) 66 are formed from the same material (e.g., polysilicon) for purposes of fabrication by surface micromachining as will be discussed in more detail below in relation to FIGS. 3A–I. The filter wall 54 may be of any configuration that defines an annular extent for the preferred embodiment, including without limitation circular, oval, triangular, square, or rectangular. Similarly, each annular seal 66 may be of any configuration that defines an annular extent, including without limitation circular, oval, triangular, square, or rectangular.

Any number of first flow ports 74 and any number of second flow ports 50 may be utilized, although preferably a plurality of first flow ports 74 and a plurality of second flow ports 50 are able to provide a flow through any particular filter trap gap 58. That is, at least two first flow ports 74 and at least two second flow ports 50 are preferably associated with each filter wall 54. Therefore, any "plugging" of an individual first flow port 74 or second flow port 50 should not totally disable any one filter trap gap 58. Another option would be to size/configure the first flow ports 74 and second flow ports 50 such that the potential for a single particle or constituent being able to totally block the same is reduced. In any case, both the first flow ports 74 and the second flow ports 50 may be of any appropriate size and/or configuration, including without limitation to accommodate the desired number/arrangement of supports 78 extending between the first film 70 and second film 46 and the desired flow through the MEMS filter module 34. Preferably, a repeating pattern is used throughout the filtering region 38 of the MEMS filter module 34 for the first flow ports 74, the second flow ports 50, the filter walls 54, and the supports 78.

The preferred fabrication technique for the various filter modules described herein is surface micromachining. Surface micromachining generally entails depositing alternate layers of structural material and sacrificial material using an appropriate substrate (e.g., a silicon wafer) which functions as the foundation for the resulting microstructure. Various patterning operations (collectively including masking, etching, and mask removal operations) may be executed on one or more of these layers before the next layer is deposited so as to define the desired microstructure. After the microstructure has been defined in this general manner, all or a portion of the various sacrificial layers are removed by exposing the microstructure and the various sacrificial layers to one or more etchants. This is commonly called "releasing" the microstructure from the substrate, typically to allow at least some degree of relative movement between the microstructure and the substrate. One particularly desirable surface micromachining technique is described in U.S. Pat. No. 6,082,208, that issued Jul. 4, 2000, that is entitled "Method For Fabricating Five-Level Microelectromechanical Structures and Microelectromechanical Transmission Formed," and the entire disclosure of which is incorporated by reference in its entirety herein (hereafter the '208 Patent).

The term "sacrificial layer or film" as used herein means any layer or portion thereof of any surface micromachined microstructure that is used to fabricate the microstructure, but which does not exist in the final configuration. Exemplary materials for the sacrificial layers described herein include undoped silicon dioxide or silicon oxide, and doped silicon dioxide or silicon oxide ("doped" indicating that additional elemental materials are added to the film during or after deposition). The term "structural layer or film" as used herein means any other layer or portion thereof of a surface micromachined microstructure other than a sacrificial layer and a substrate on which the microstructure is being fabricated. Exemplary materials for the structural layers described herein include doped or undoped polysilicon and doped or undoped silicon. Exemplary materials for the substrates described herein include silicon. The various layers described herein may be formed/deposited by techniques such as chemical vapor deposition (CVD) and including low-pressure CVD (LPCVD), atmospheric-pressure CVD (APCVD), and plasma-enhanced CVD (PECVD), thermal oxidation processes, and physical vapor deposition (PVD) and including evaporative PVD and sputtering PVD, as examples.

Figure 3B:
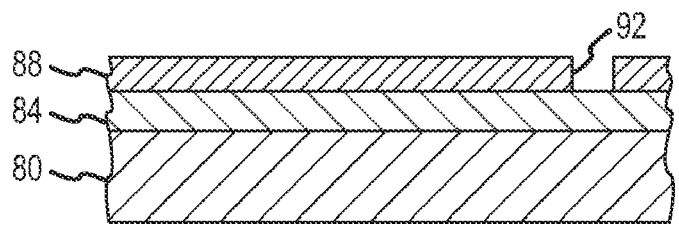

In more general terms, surface micromachining can be done with any suitable system of a substrate, sacrificial film(s) or layer(s) and structural film(s) or layer(s). Many substrate materials may be used in surface micromachining operations, although the tendency is to use silicon wafers because of their ubiquitous presence and availability. The substrate is essentially a foundation on which the microstructures are fabricated. This foundation material must be stable to the processes that are being used to define the microstructure(s) and cannot adversely affect the processing of the sacrificial/structural films that are being used to define the microstructure(s). With regard to the sacrificial and structural films, the primary differentiating factor is a selectivity difference between the sacrificial and structural films to the desired/required release etchant(s). This selectivity ratio may be on the order of about 10:1, and is more preferably several hundred to one or much greater, with an infinite selectivity ratio being most preferred. Examples of such a sacrificial film/structural film system include: various silicon oxides/various forms of silicon; poly germanium/poly germanium-silicon; various polymeric films/various metal films (e.g., photoresist/aluminum); various metals/various metals (e.g., aluminum/nickel); polysilicon/silicon carbide; silicone dioxide/polysilicon (i.e., using a different release etchant like potassium hydroxide, for example). Examples of release etchants for silicon dioxide and silicon oxide sacrificial materials are typically hydrofluoric (HF) acid based (e.g., undiluted or concentrated HF acid, which is actually 49 wt % HF acid and 51 wt % water; concentrated HF acid with water; buffered HF acid (HF acid and ammonium fluoride)). FIG. 3A illustrates a first sacrificial film 84 (commonly referred to as the SacOx1 layer or level in the process described in the '208 Patent) having been formed over the substrate 80. Although the first sacrificial film 84 could be formed directly on the substrate 80, typically there will be one or more intermediate layers or films (not shown, but commonly referred to as the P0 layer or level in the process described in the '208 Patent from which electrical traces or the like are formed, which in turn is separated from the substrate material by an oxide or nitride film or layer). In any case, a first film 88 (commonly referred to as the combined P2/P1 layers or levels in the process described in the '208 Patent) is formed on the first sacrificial film 84. The first film 88 is then patterned to define a first flow port aperture 92 as illustrated in FIG. 3B. This first flow port aperture 92 will become a first flow port 120 for the first film 88 when the MEMS filter module is released at the end of fabrication (FIG. 3I).

Figure 3C:
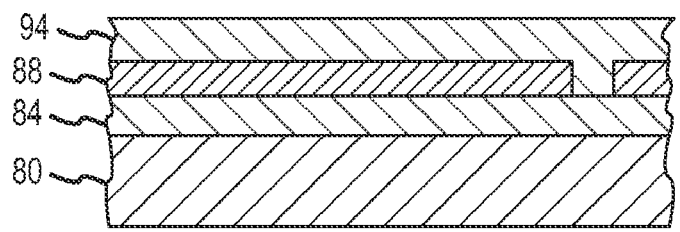
Figure 3D:
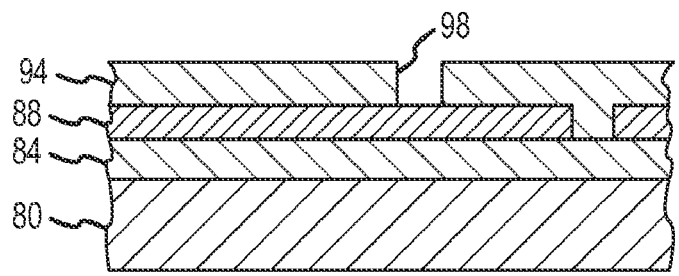

A second sacrificial film 94 (commonly referred to as the SacOx3 layer or level in the process described in the '208 Patent) is then formed on the first film 88 (FIG. 3C). This second sacrificial film 94 will extend within and typically at least substantially "fill" the first flow port aperture 92 in the first film 88. The second sacrificial film 94 is then patterned to define a filter wall aperture 98. This filter wall aperture 98 extends all the way down to the first film 88. Typically, the second sacrificial film 94 will be over-etched, such that a small portion of the upper surface of the first film 88 will be etched by the formation of the filter wall aperture 98 as well. That is, there may be a small depression on the upper surface of the first film 88 corresponding with the filter wall aperture 98 in the second sacrificial film 94 after the patterning of the second sacrificial film 94 to define the filter wall aperture 98 (not shown).

Figure 3E:
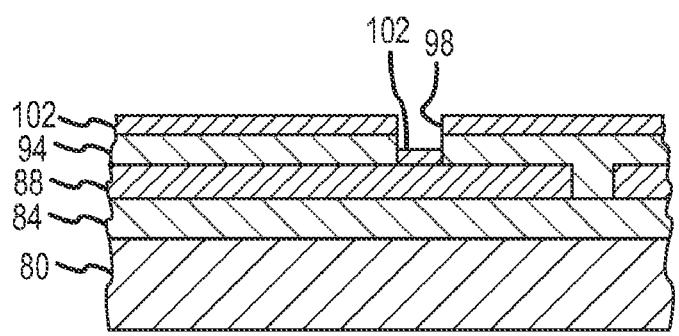

FIG. 3E illustrates that additional sacrificial material 102 is formed on the upper surface of the second sacrificial film 94. Although the sacrificial material 102 in the second sacrificial film 94 are shown as separate structures in FIGS. 3E–H, this additional sacrificial material 102 is in effect almost indistinguishable from and becomes part of the second sacrificial film 94. The sacrificial material 102 is also deposited on the surface of the first film 88 that is exposed by the filter wall aperture 98 in the second sacrificial film 94. It is possible that a certain amount of the sacrificial material 102 will also be deposited on the sidewall of the filter wall aperture 98 in the second sacrificial film 94 (not shown). The thickness of the sacrificial material 102 can be very accurately controlled and is used to define the thickness of a filter trap gap 123 in the resulting MEMS filter module (FIG. 3I). For instance, it is possible to deposit the sacrificial material 102 within a tolerance of ±2% of the target thickness.

Figure 3F:
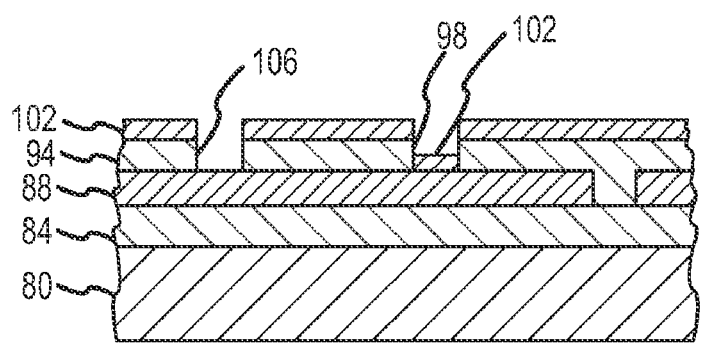
Figure 3G:
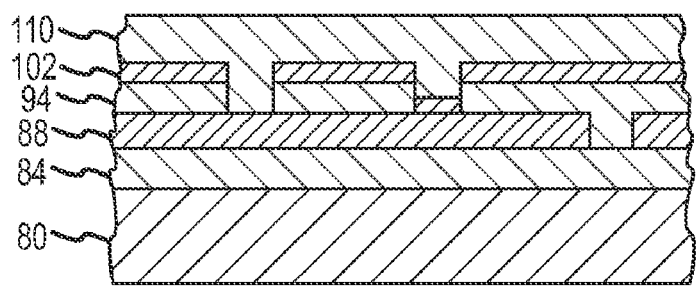

The film of sacrificial material 102 is then patterned to define a support post aperture 106 that exposes a corresponding portion of the upper surface of the first film 88 (FIG. 3F). That is, the support post aperture 106 extends completely through the layer of sacrificial material 102 and through the second sacrificial film 94 to the underlying first film 88. A second film 110 is then formed on the upper surface of the layer of sacrificial material 102 as illustrated in FIG. 3G. This second film 110 will extend within and typically at least substantially "fill": 1) the support post aperture 106 in the layer of sacrificial material 102 and the second sacrificial film 94 so as to define a support 118 for the MEMS filter module; and 2) the filter wall aperture 98 in the layer of sacrificial material 102 and the second sacrificial film 94 so as to define a filter wall 121 for the MEMS filter module (FIG. 3I). The distal end of the filter wall 121 (FIG. 3I) is spaced from the first film 88 by the corresponding portion of sacrificial material 102 (FIG. 3G). This sacrificial material 102 is removed by the release of the filter module so as to define a filter trap or filter trap gap 123 (FIG. 3I).

Figure 3H:
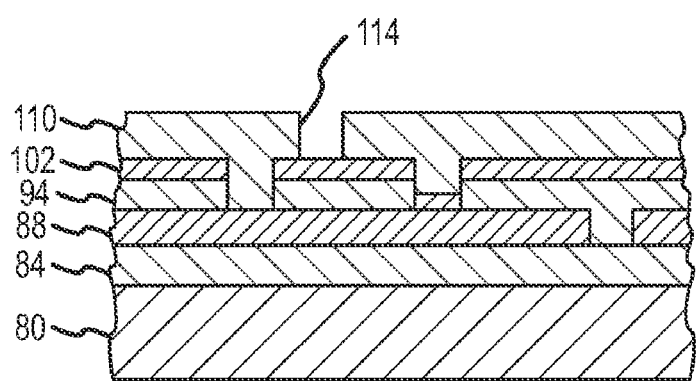
Figure 3I:
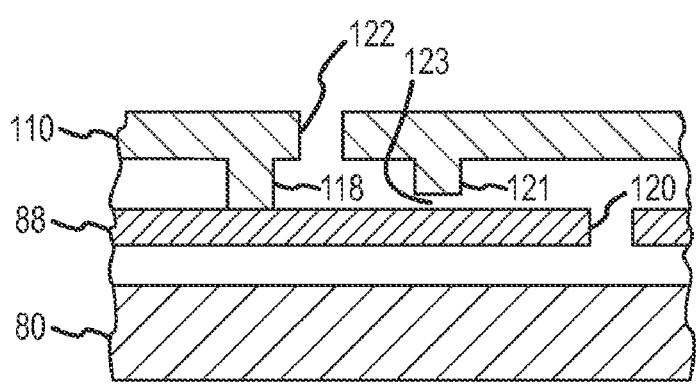

The second film 110 is then patterned to define a second flow port aperture 114 as illustrated in FIG. 3H. This second flow port aperture 114 will become a second flow port 122 for the second film 110 when the MEMS filter module is released at the end of fabrication. In this regard and referring to FIG. 3I, the "stack" is then exposed to an appropriate etchant that removes the first sacrificial film 84, the second sacrificial film 94, and the sacrificial material 102. The MEMS filter module may remain structurally supported above the substrate 80 after the release (not shown) as will be discussed in more detail below. The MEMS filter module is, however, ultimately separated from the substrate 80 for incorporation into the filter 10 as will be discussed in more detail below in relation to FIGS. 10A–11B.

Various embodiments of MEMS filter modules are illustrated in FIGS. 5A–8D that are in accordance with the principles of the MEMS filter module 34 of FIGS. 2A–F. Unless otherwise noted herein, the discussion of the MEMS filter module 34 is equally applicable to each of these MEMS filter modules. Reference should be made to the discussion presented above with regard to components of the MEMS filter module 34 that are used by these MEMS filter modules. Moreover, each of these MEMS filter modules may be used in place of the MEMS filter module 34 in the filter 10 of FIG. 1.

FIGS. 4A–F illustrate one embodiment of a MEMS filter module 124 having a filtering region 126. The filter module 124 includes a first film 130 and a second film 138 that are disposed in spaced relation or at different elevations. Each of these films 130, 138 defines an extreme for the filter module 124 in both the filtering region 126 and in its perimeter region 42 (not shown, but in accordance with the embodiment of FIGS. 2A–F). As such, the films 130, 138 are interconnected and supported about their respective perimeter regions by each annular seal 66 used by the filter module 124. The films 130, 138 are thereby "continuous" structures in the same manner discussed above in relation to the films 70, 46.

The first film 130 includes a plurality of first flow ports 134, while the second film 138 includes a plurality of second flow ports 142. All of the first flow ports 134 and all of the second flow ports 142 are located only in the filtering region 126 of the filter module 124. A plurality of supports 154 extend between and structurally interconnect the first film 130 and the second film 138 in the filtering region 126. These supports 154 are distributed throughout the filtering region 126 in a repeating pattern, are disposed in spaced relation to each other, and may be of any appropriate configuration. A plurality of filter walls 150 are attached to and extend from the second film 138 and at least toward (in the direction of) the first film 130. Any number of filter walls 150 may be utilized in the filtering region 126 of the filter module 124. Although any number of supports 154 may be utilized as well, the number and location of the supports 154 is subject to the same characterizations discussed above in relation to the supports 78. In addition and for the case of the filtering region 126 of the filter module 124, one support 154 is positioned inwardly of each filter wall 150 in a central location, and a plurality of supports 154 are disposed about each filter wall 150. Any number of supports 154 may be disposed about each filter wall 150 (four in the illustrated embodiment, with one support 154 being centrally disposed between the corners of each 2×2 grouping of four adjacent filter walls 150).

Each filter wall 150 has an annular configuration. "Annular" in this context means that each filter wall 150 has a closed perimeter when looking at the distal end of the filter wall 150 (that which is opposite the end of the filter wall 150 that interfaces with the second film 138). Stated another way, each filter wall 150 extends a full 360 degrees about a certain reference axis along any appropriate path. Although each filter wall 150 has a square, annular extent in the illustrated embodiment, any configuration could be utilized for the filter wall 150 to realize the noted annular extent (e.g., rectangular, circular, oval, triangular). Each filter wall 150 also does not extend all the way to the first film 130. Instead, a filter trap or a filter trap gap 152 exists between the distal end of each filter wall 150 and the first film 130. Since each filter wall 150 is annular, its corresponding filter trap gap 152 will likewise be annular. Note that each filter wall 150 is also offset from the various first flow ports 134 and second flow ports 142, thereby inducing at least one change in direction for the flow through the MEMS filter module 124.

Flow may be directed through each filter trap gap 152 to provide a filtering function. Any constituent in the flow (e.g., particulates, cells of a certain size) that is larger than the height of a particular filter trap gap 152 will typically be collectively retained by the corresponding filter wall 150 and the first film 130 (i.e., by being unable to pass through the filter trap gap 152). Since each filter trap gap 152 is annular, any constituent that is "trapped" by being unable to pass through a particular filter trap gap 152 will then not totally "plug" the filter trap gap 152. Having an annular filter trap gap 152 associated with each filter wall 150 also provides a desired flow rate through the MEMS filter module 124. The number and location of the various supports 154 is selected such that the height of each filter trap gap 152 throughout the filtering region 126 is maintained within a small tolerance for the maximum flow rate for which the filter module 124 is designed in the same manner discussed above in relation to the filter trap gap 58.

The flow may enter the MEMS filter module 124 either through the second flow ports 142 (in which case the flow out of the MEMS filter module 124 would be through the first flow ports 134), or through the first flow ports 134 (in which case the flow out of the MEMS filter module 124 would be through the second flow ports 142). In either case, the flow will be directed into a space 148a or a space 148b that extends from the first film 130 to the second film 138 before attempting to pass through a filter trap gap 152 associated with a particular filter wall 150. Each of these spaces 148a, 148b in the filtering region 126 may be characterized as a filter trap chamber 148a, 148b. The height of each filter trap chamber 148a, 148b corresponds with the spacing between the first film 130 and the second film 138, which is greater than the height of the filter trap gap 152. Each annular filter wall 150 defines a filter trap chamber 148a, while the space between the various filter walls 150 defines a single filter trap chamber 148b.

The volume of each filter trap chamber 148a may be larger than the volume of any associated first flow port 134, while the volume of the filter trap chamber 148b may be larger than the volume of any associated second flow port 142, although such is not a requirement. Whether the flow enters the MEMS filter module 124 through the first flow ports 134 or the second flow ports 142, the flow will go through a filter trap chamber 148a or the filter trap chamber 148b, then through a filter trap gap 152, and then through the other of a filter trap chamber 148a or the filter trap chamber 148b in the case of the filter module 124. Specifically, a flow entering the MEMS filter module 124 through the second flow ports 142 will flow into the filter trap chamber 148a, through the corresponding filter trap gap 152, into a filter trap chamber 148a, and then out of the MEMS filter module 124 through the first flow ports 134. The reverse would be the case for a flow entering the MEMS filter module 124 through the first flow ports 134.

Figure 4A:
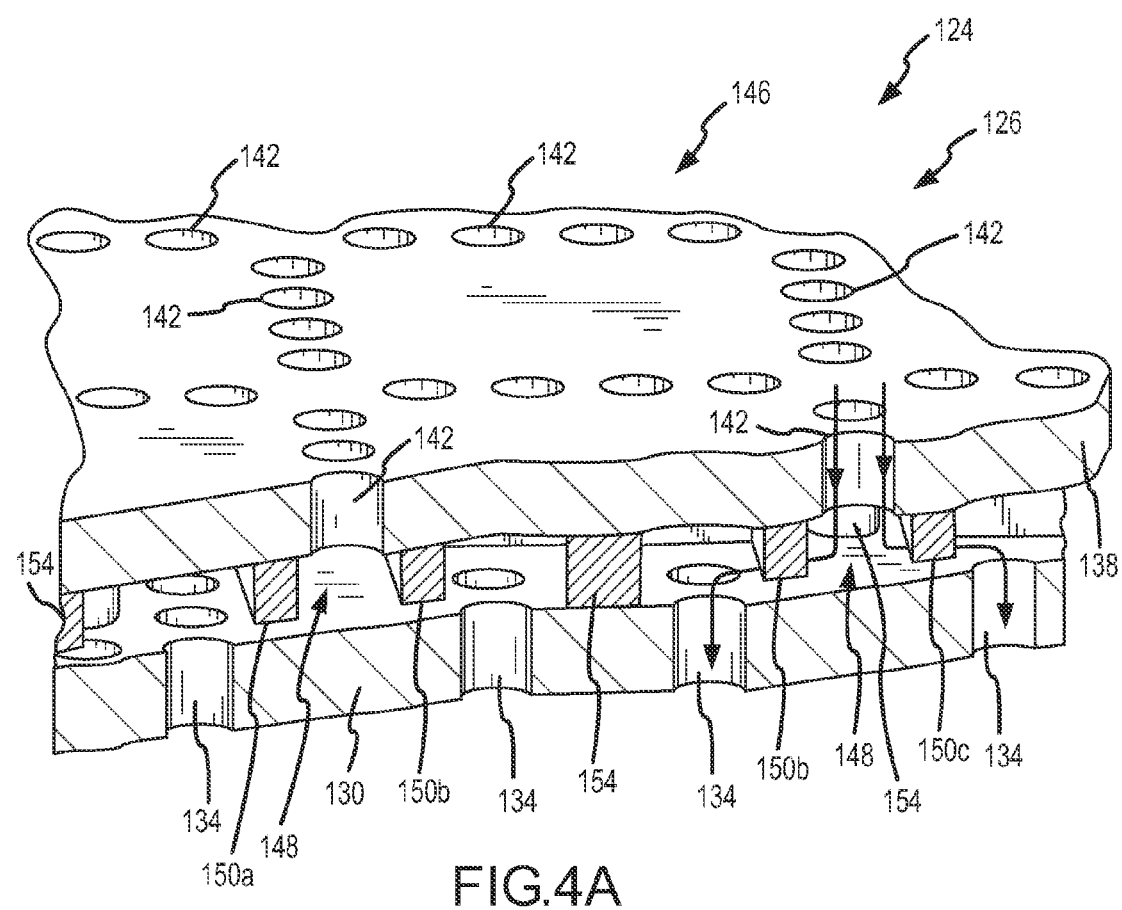
FIG. 4A is a perspective, cross-sectional view of one embodiment of a filtering region configuration that may be used throughout the filtering region of the MEMS filter module of FIG. 2A.
Figure 4B:
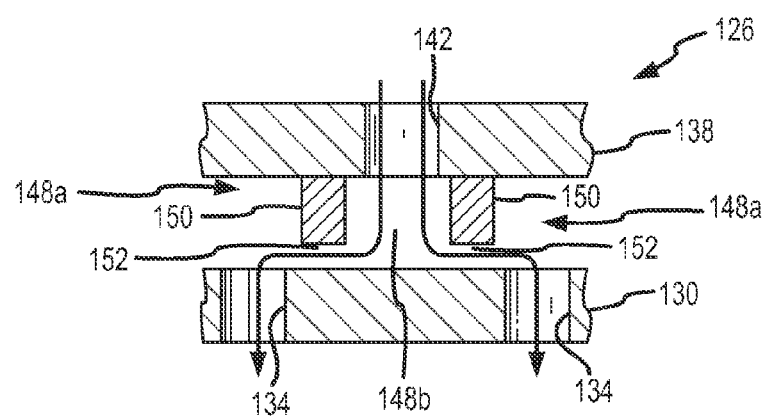
FIG. 4B is a cross-sectional view of a pair of filter traps used by the filtering region configuration of FIG. 4A.
Figure 4C:
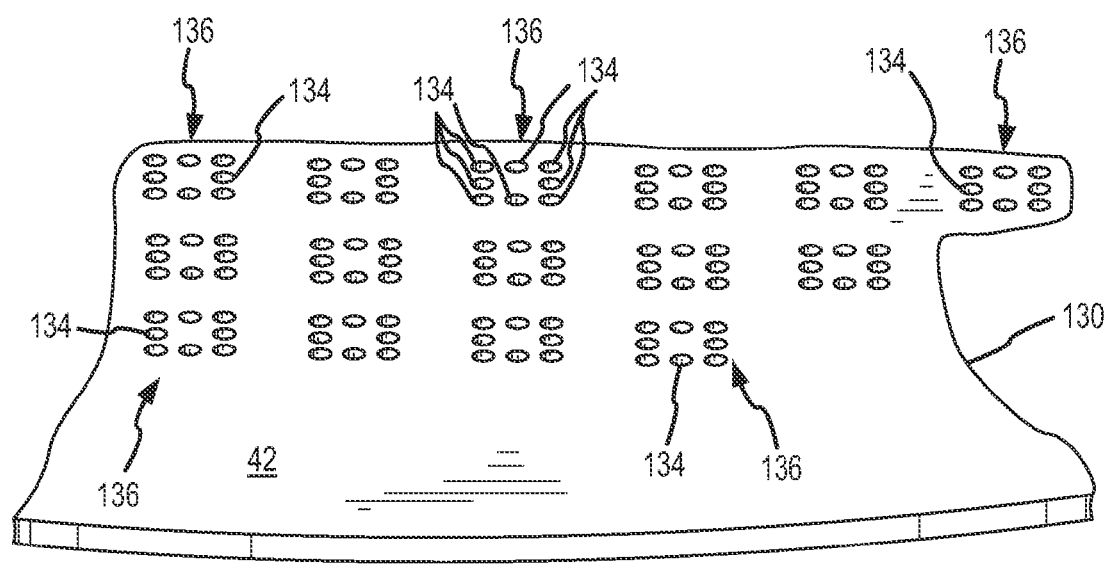
FIG. 4C is a perspective view of part of the lower film used by the filtering region configuration of FIG. 4A.
Figure 4D:
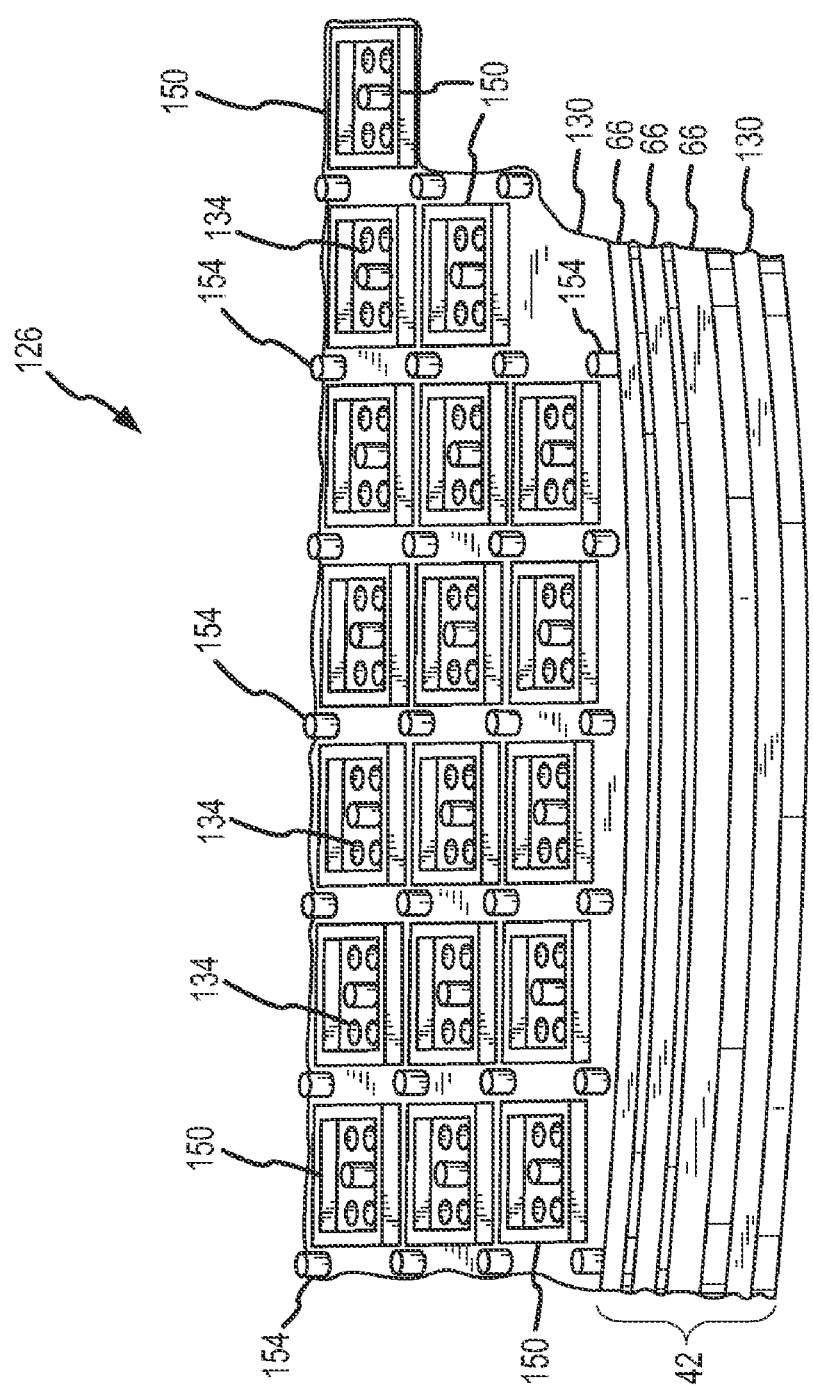
FIG. 4D is a perspective view of part of the filtering region configuration of FIG. 4A, with the upper film having been removed.
Figure 4E:
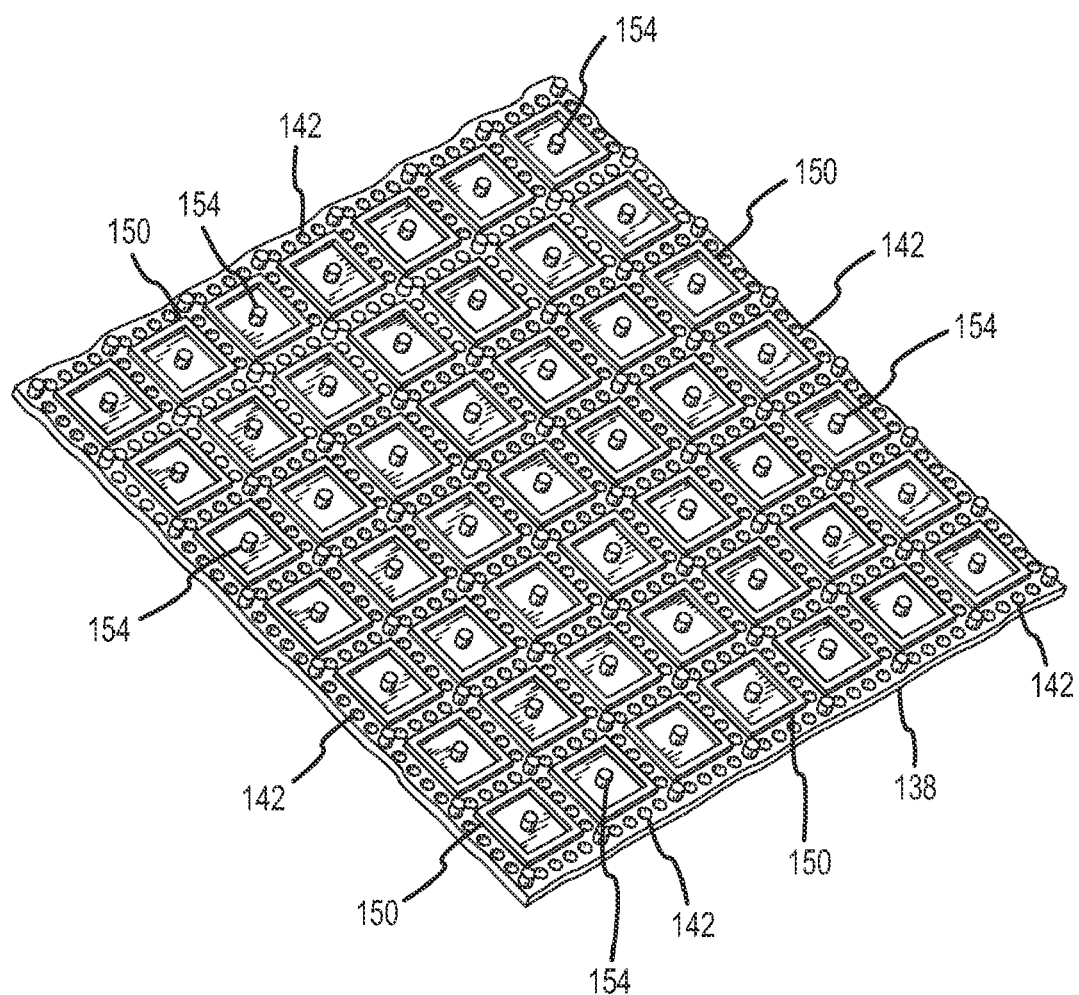
FIG. 4E is a perspective, bottom view of part of the upper film of the filtering region configuration of FIG. 4A, illustrating the filter walls and supports extending therefrom.
Figure 4F:
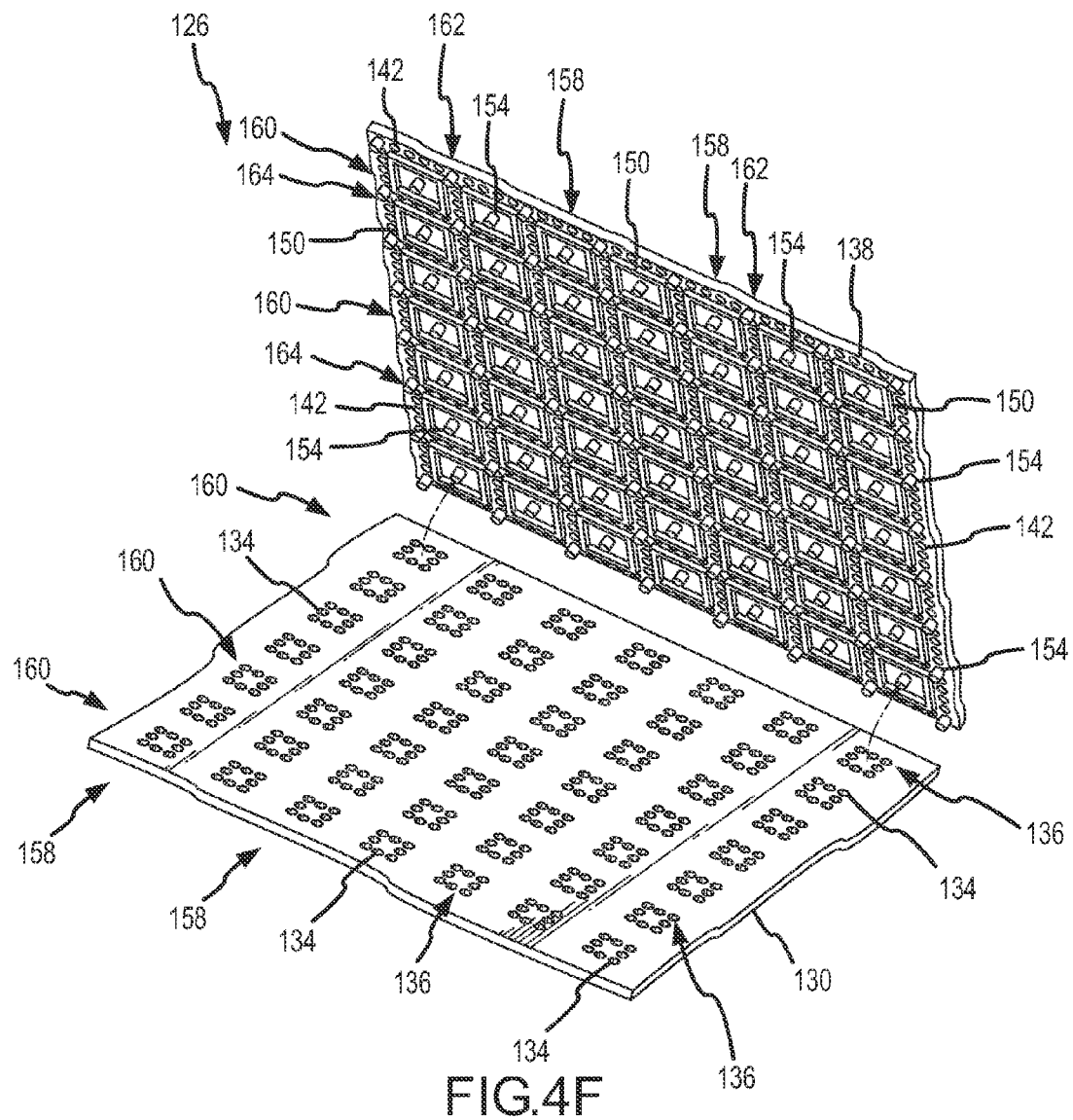
FIG. 4F is perspective view of part of the filtering region configuration of FIG. 4A, with the upper film having been exploded away from the lower film.
Figure 5A:
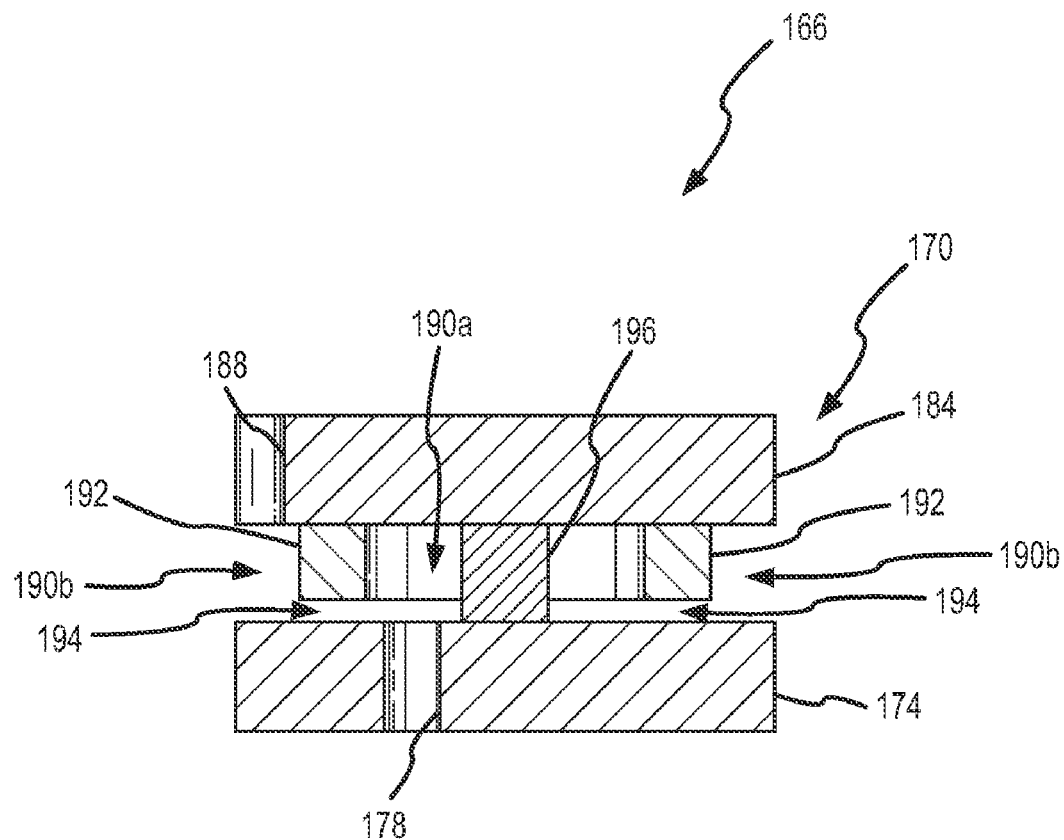
FIG. 5A is a cross-sectional view of another embodiment of a filtering region configuration that may be used throughout the filtering region of the MEMS filter module of FIG. 2A.
Figure 5B:
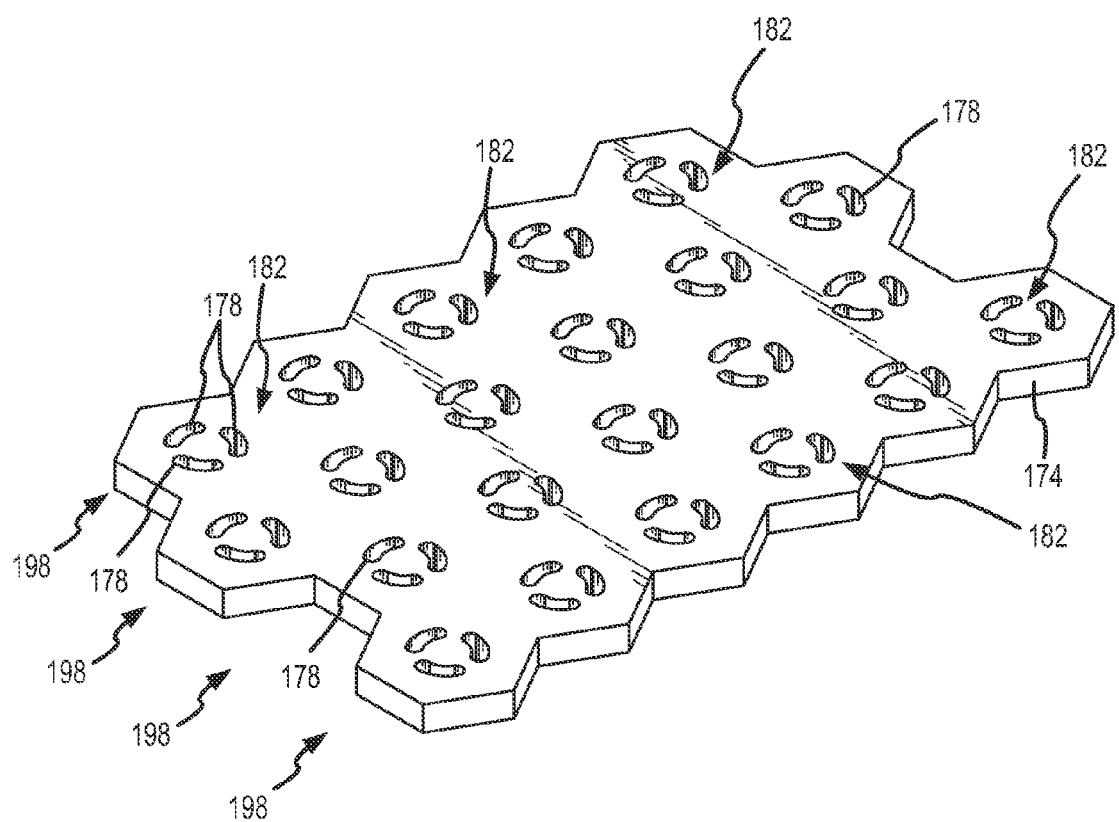
FIG. 5B is a perspective view of part of the lower film used by the filtering region configuration of FIG. 5A.
Figure 5C:
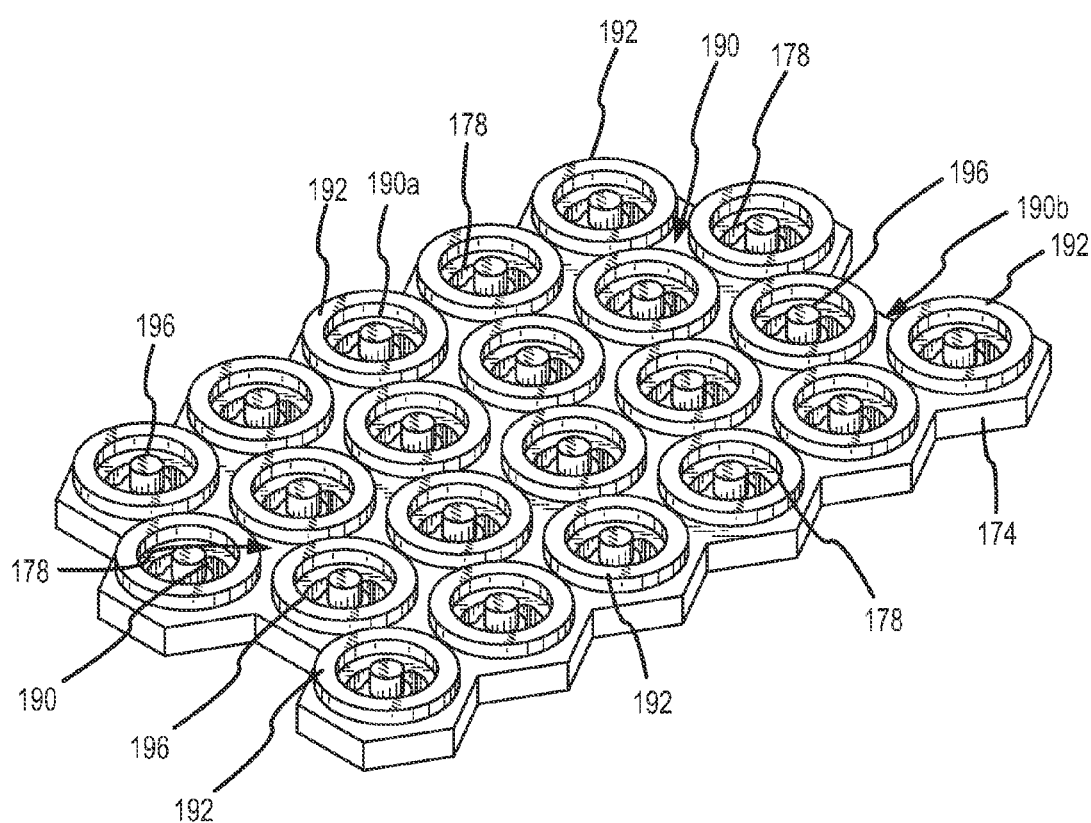
FIG. 5C is a perspective view of part of the filtering region configuration of FIG. 5A, with the upper film having been removed.
Figure 5E:
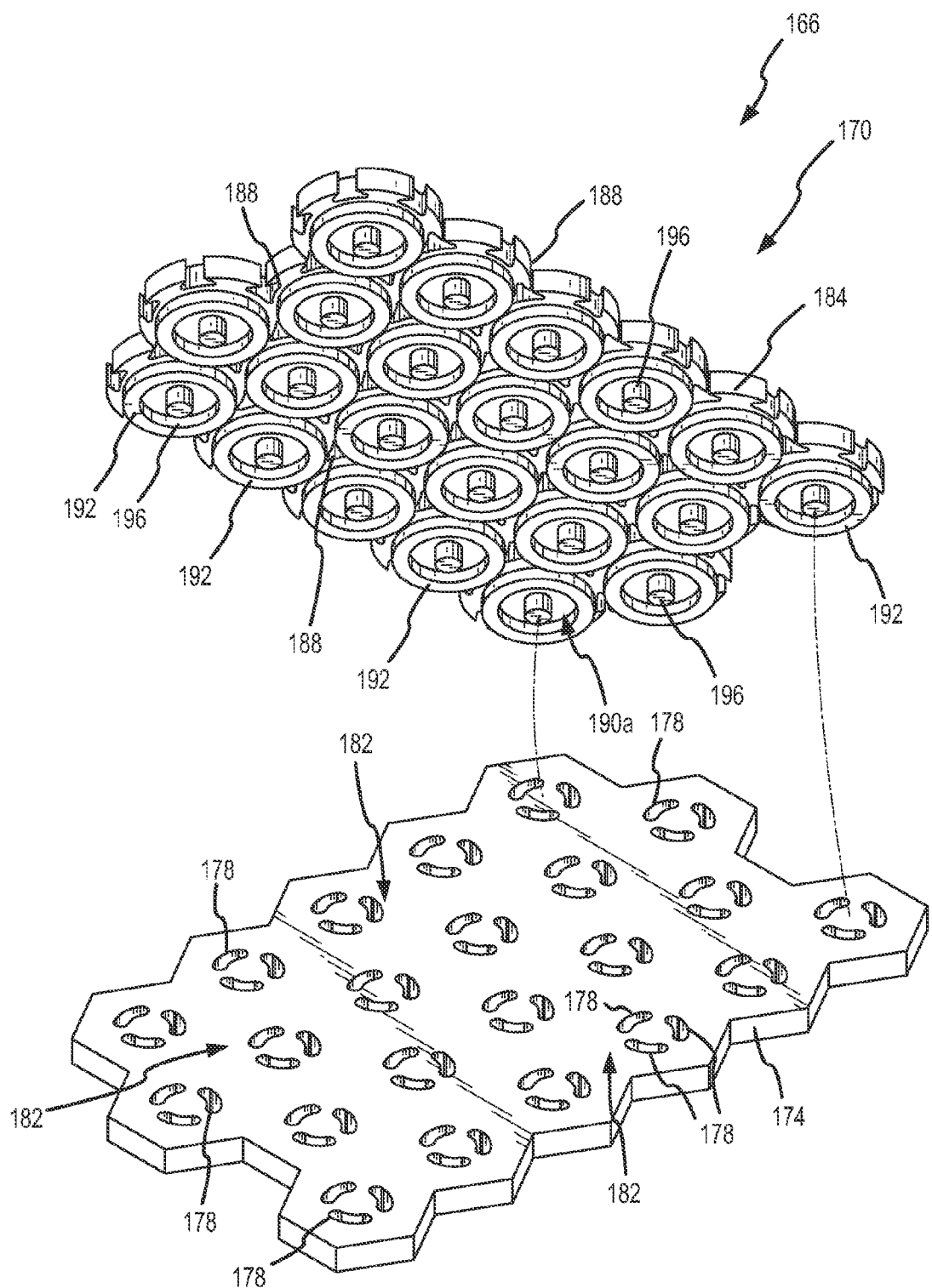
FIG. 5E is perspective view of part of the filtering region configuration of FIG. 5A, with the upper film having been exploded away from the lower film.
Figure 6A:
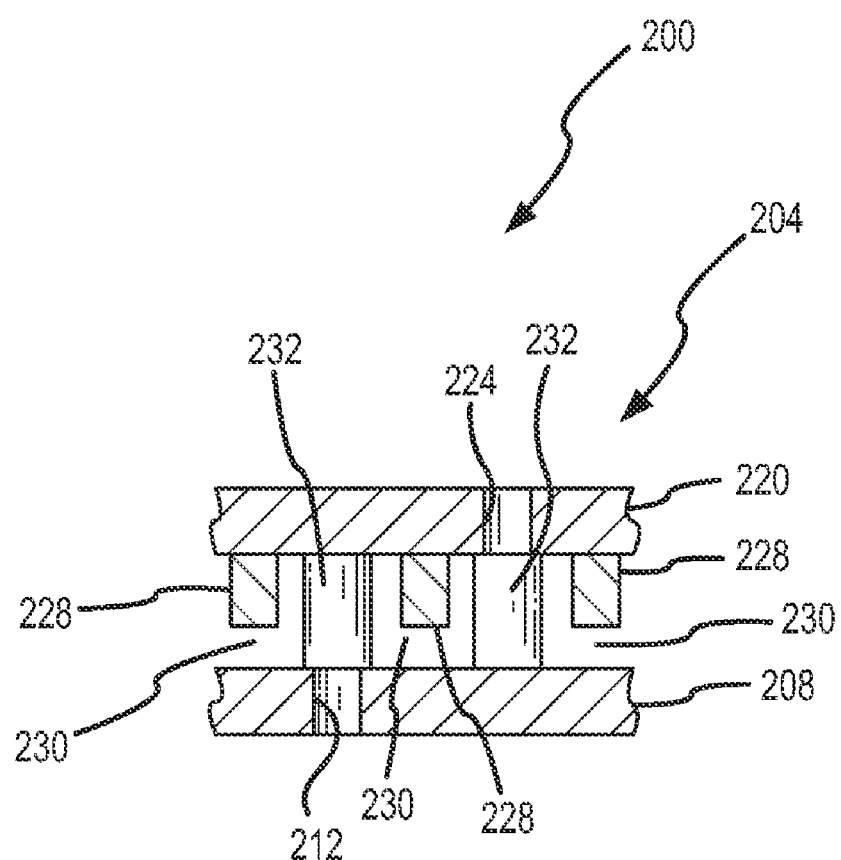
FIG. 6A is a cross-sectional view of another embodiment of a filtering region configuration that may be used throughout the filtering region of the MEMS filter module of FIG. 2A.
Figure 6B:
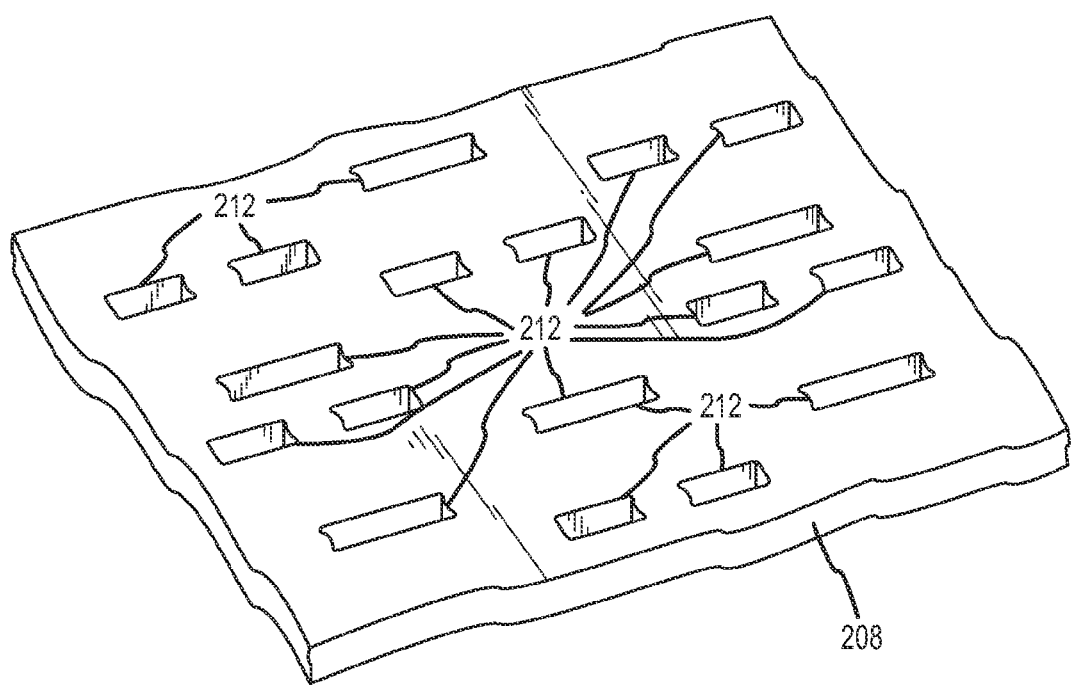
FIG. 6B is a perspective view of part of the lower film used by the filtering region configuration of FIG. 6A.
Figure 6C:
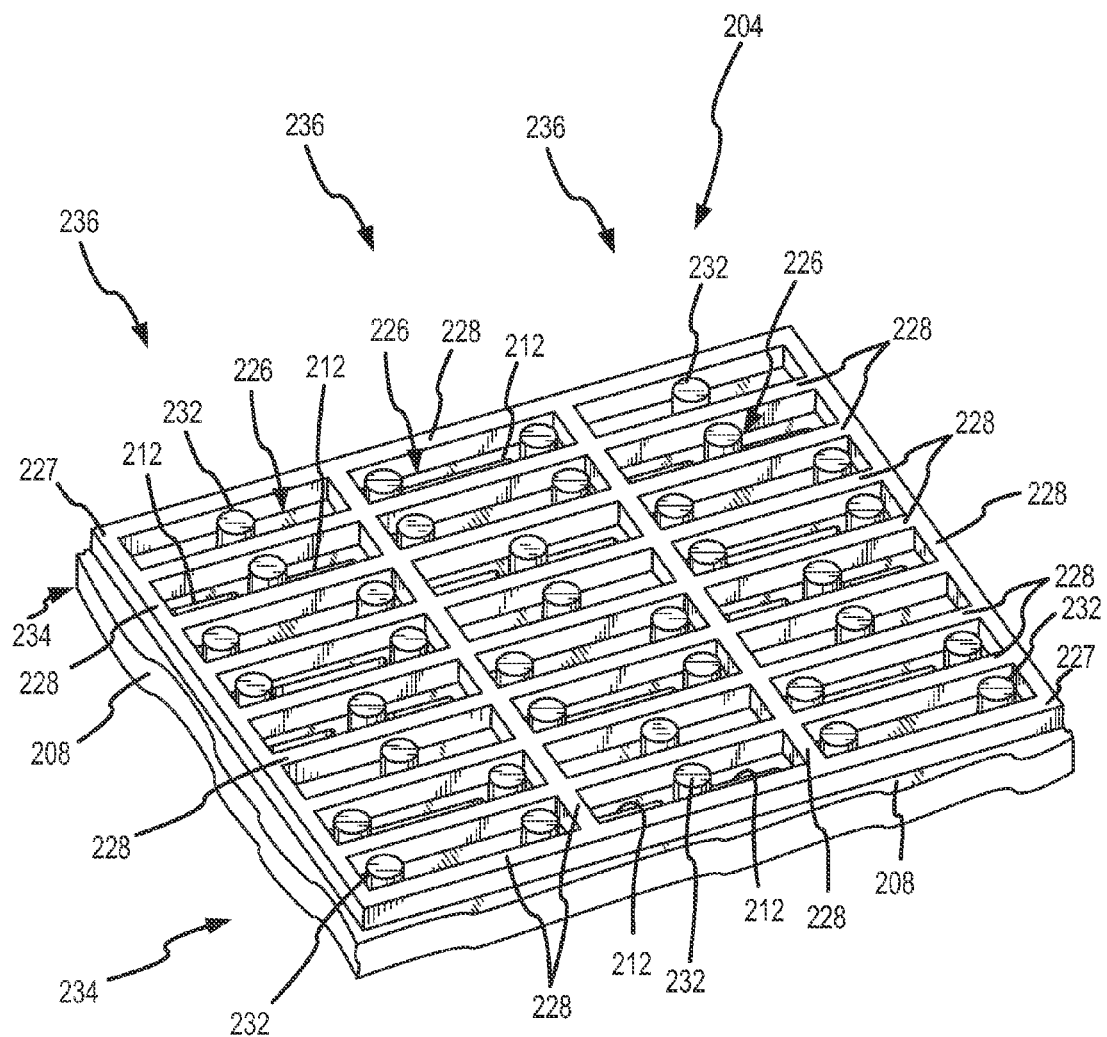
FIG. 6C is a perspective view of part of the filtering region configuration of FIG. 6A, with the upper film having been removed.
Figure 6D:
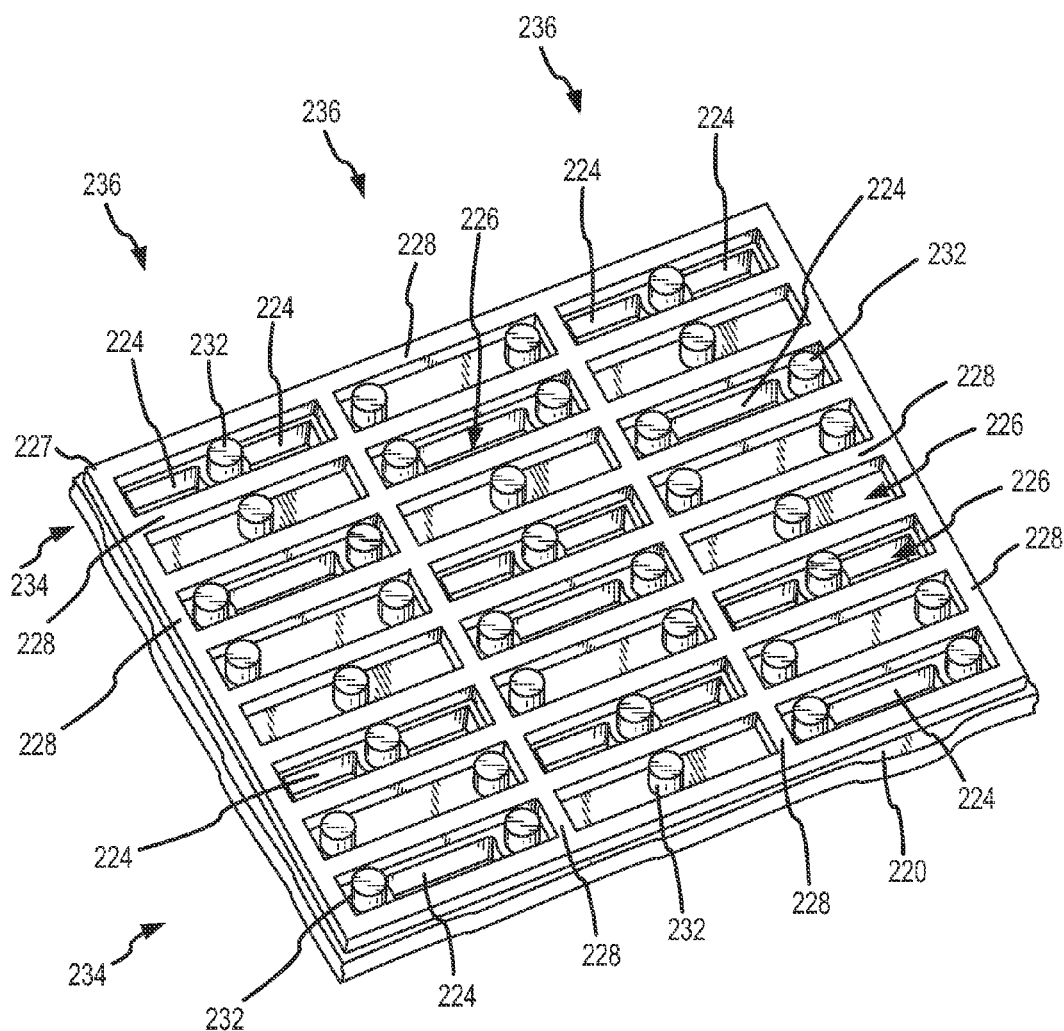
FIG. 6D is a perspective, bottom view of part of the upper film of the filtering region configuration of FIG. 6A, illustrating the filter walls and supports extending therefrom.
Figure 7A:
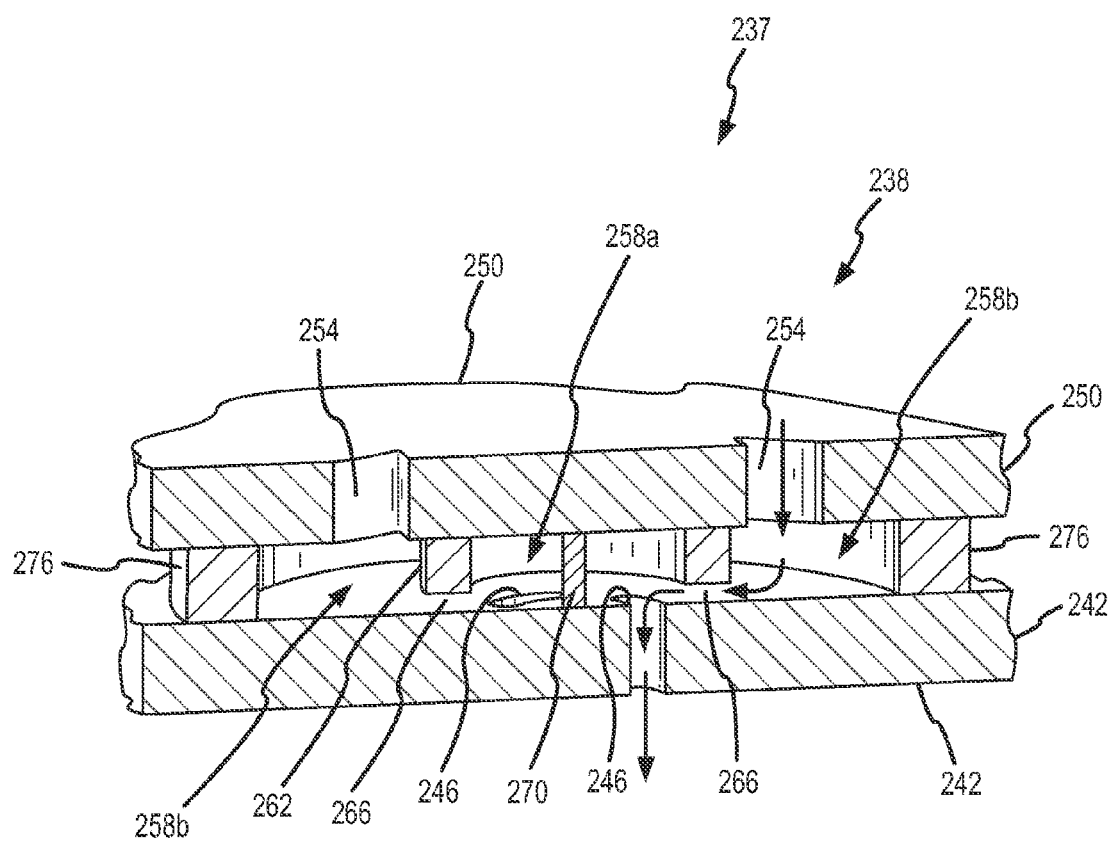
FIG. 7A is a perspective, cross-sectional view of another embodiment of a filtering region configuration that may be used throughout the filtering region of the MEMS filter module of FIG. 2A.
Figure 7B:
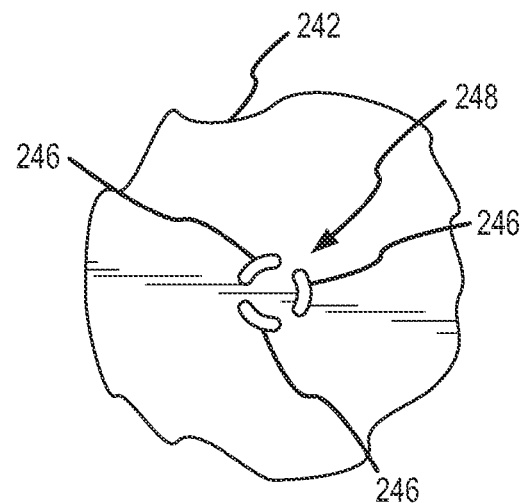
FIG. 7B is a top, plan view of part of the lower film used by the filtering region of FIG. 7A.
Figure 7C:
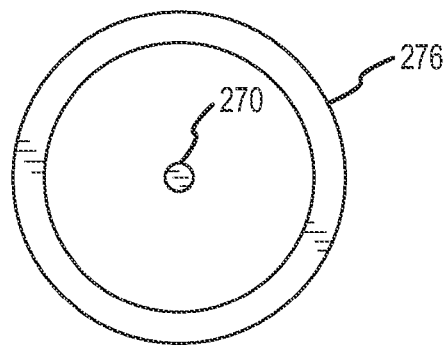
FIG. 7C is a top, plan view of one central support and its corresponding annular support/seal used by the filtering region of FIG. 7A.
Figure 7D:
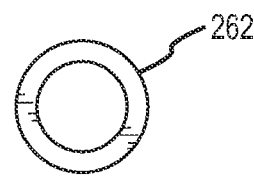
FIG. 7D is a top, plan view of one annular filter wall used by the filtering region of FIG. 7A.
Figure 7E:
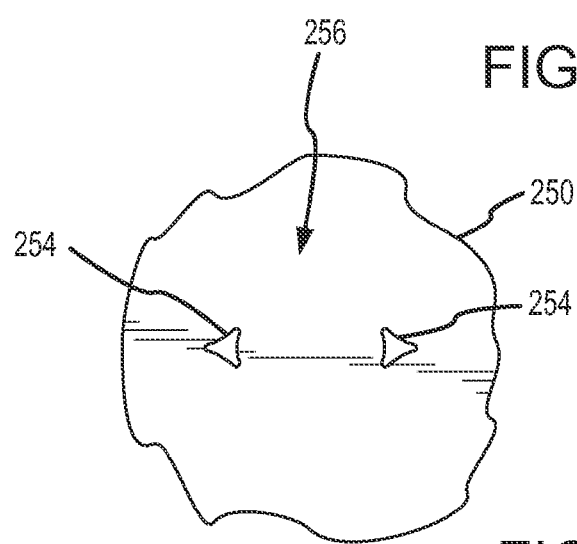
FIG. 7E is a top, plan view of part of the upper film used by the filtering region of FIG. 7A.
Figure 8A:
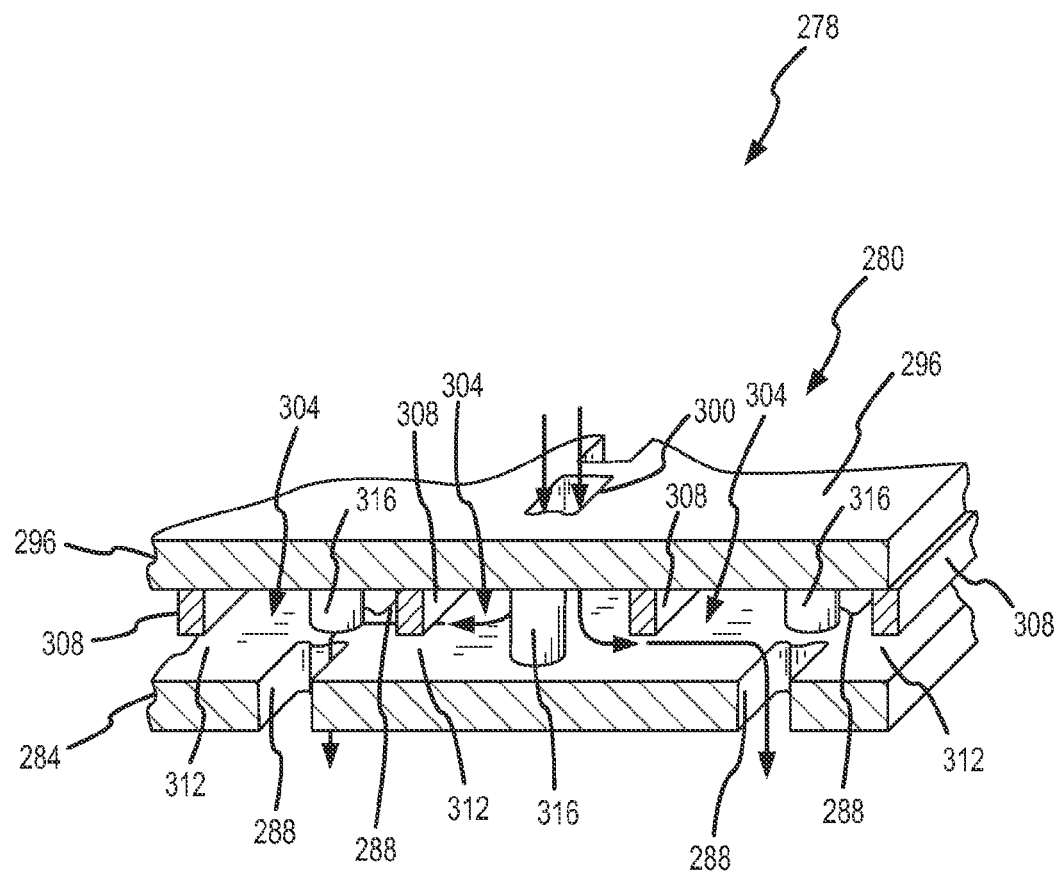
FIG. 8A is a perspective, cross-sectional view of another embodiment of a filtering region configuration that may be used throughout the filtering region of the MEMS filter module of FIG. 2A.
Figure 8B:
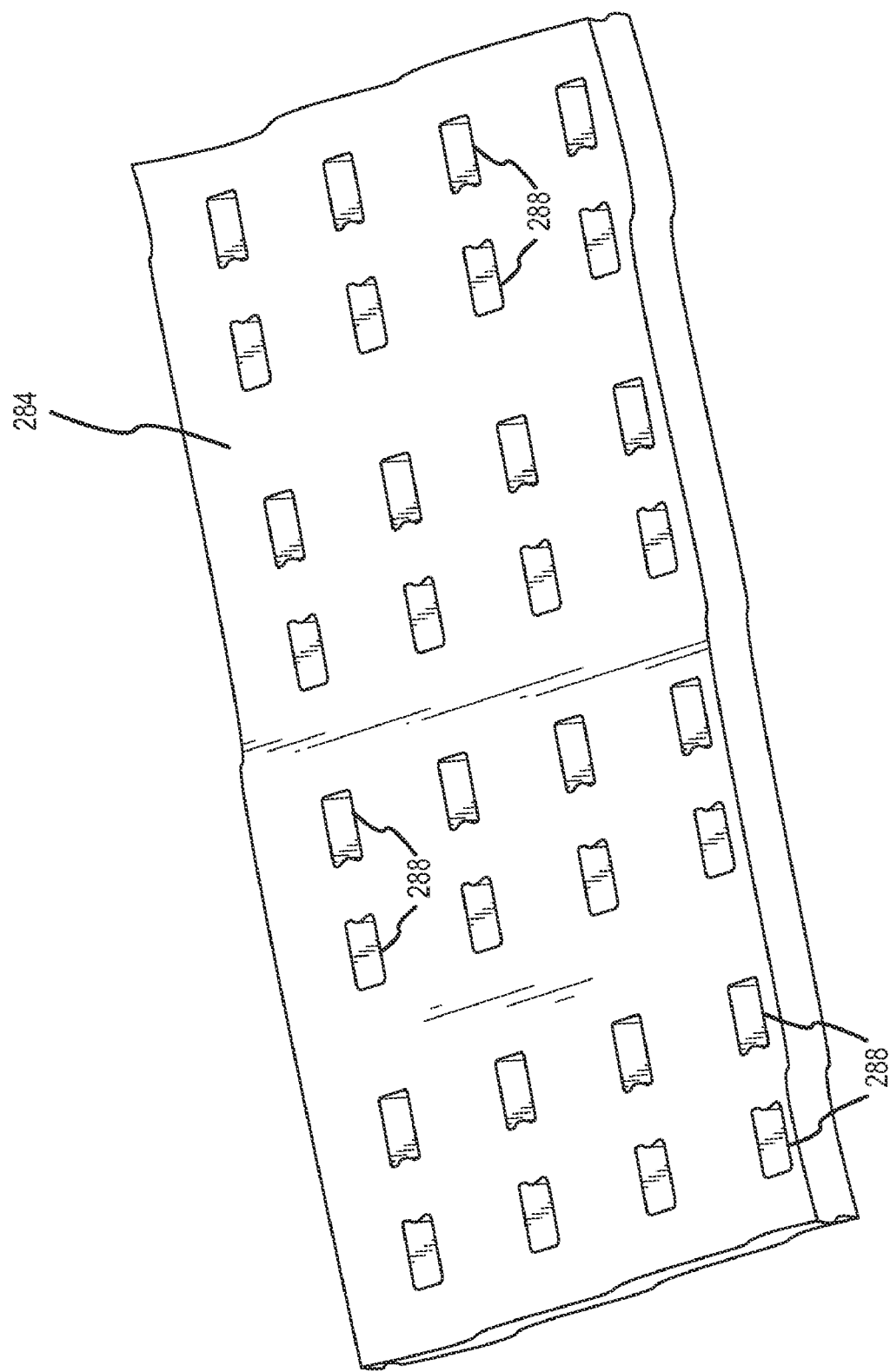
FIG. 8B is a perspective view of part of the lower film used by the filtering region configuration of FIG. 8A.
Figure 8C:
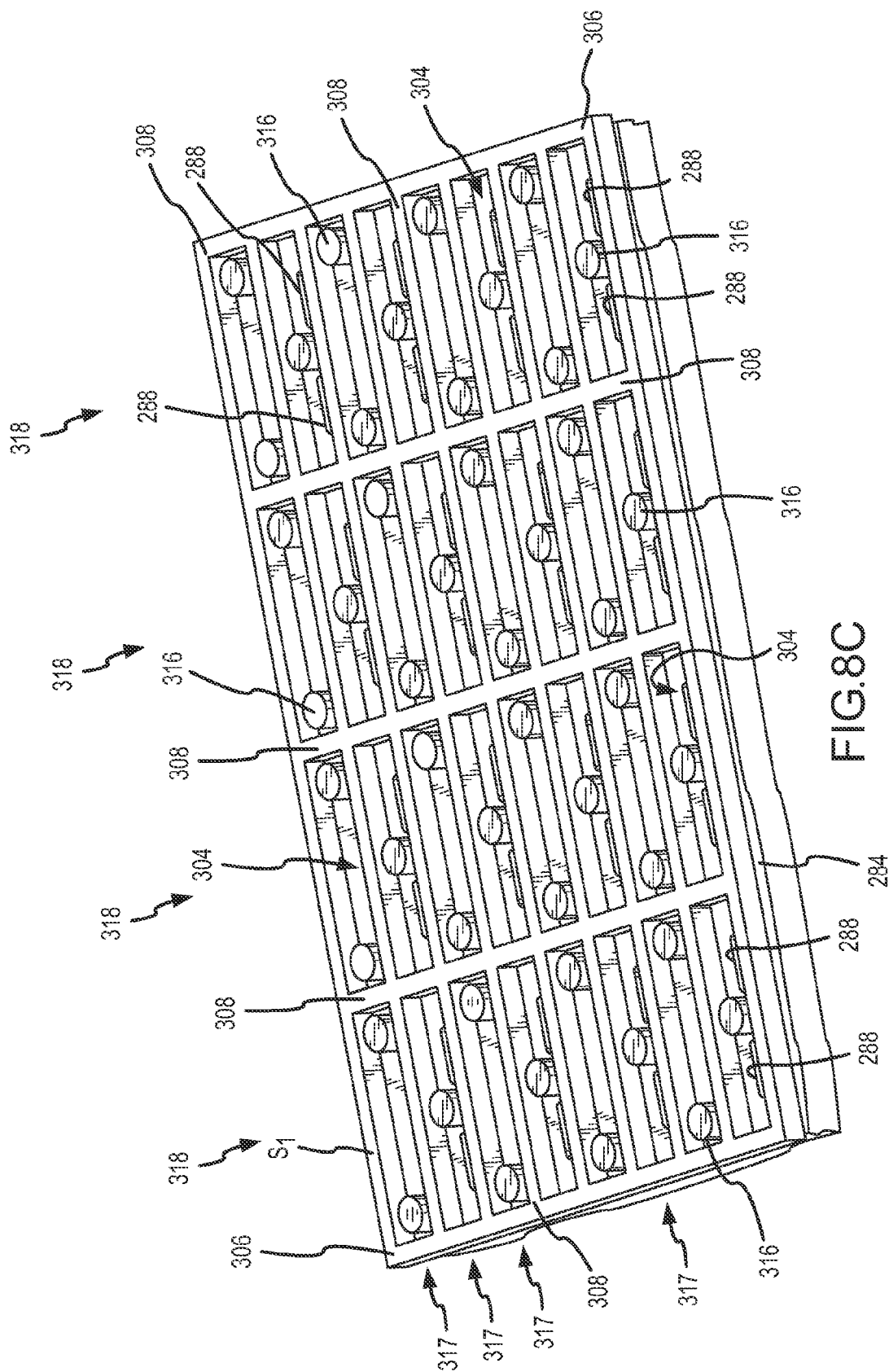
FIG. 8C is a perspective view of part of the filtering region configuration of FIG. 8A, with the upper film having been removed.
Figure 8D:
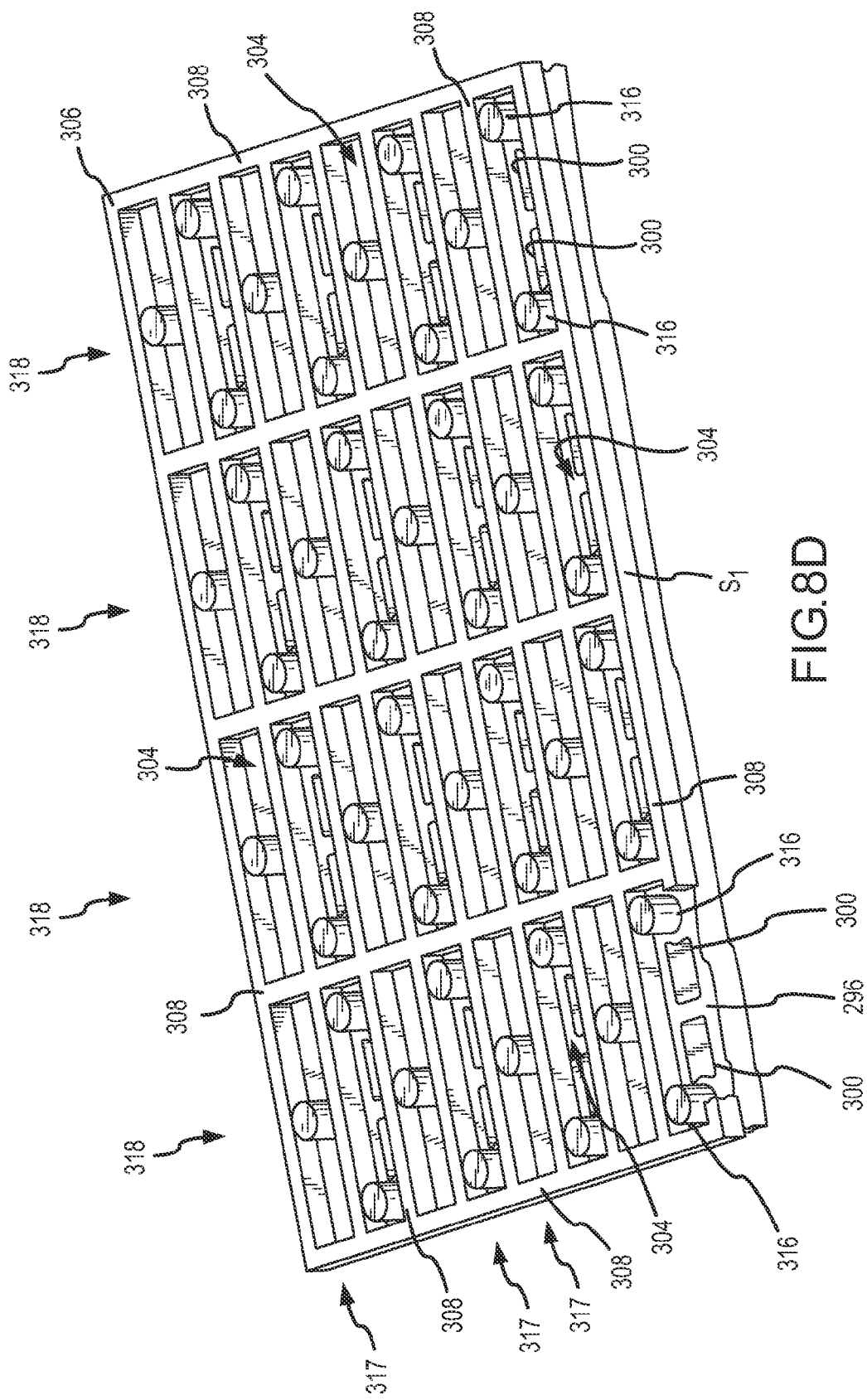
FIG. 8D is a perspective, bottom view of part of the upper film of the filtering region configuration of FIG. 8A, illustrating the filter walls and support posts extending therefrom.
Figure 9A:
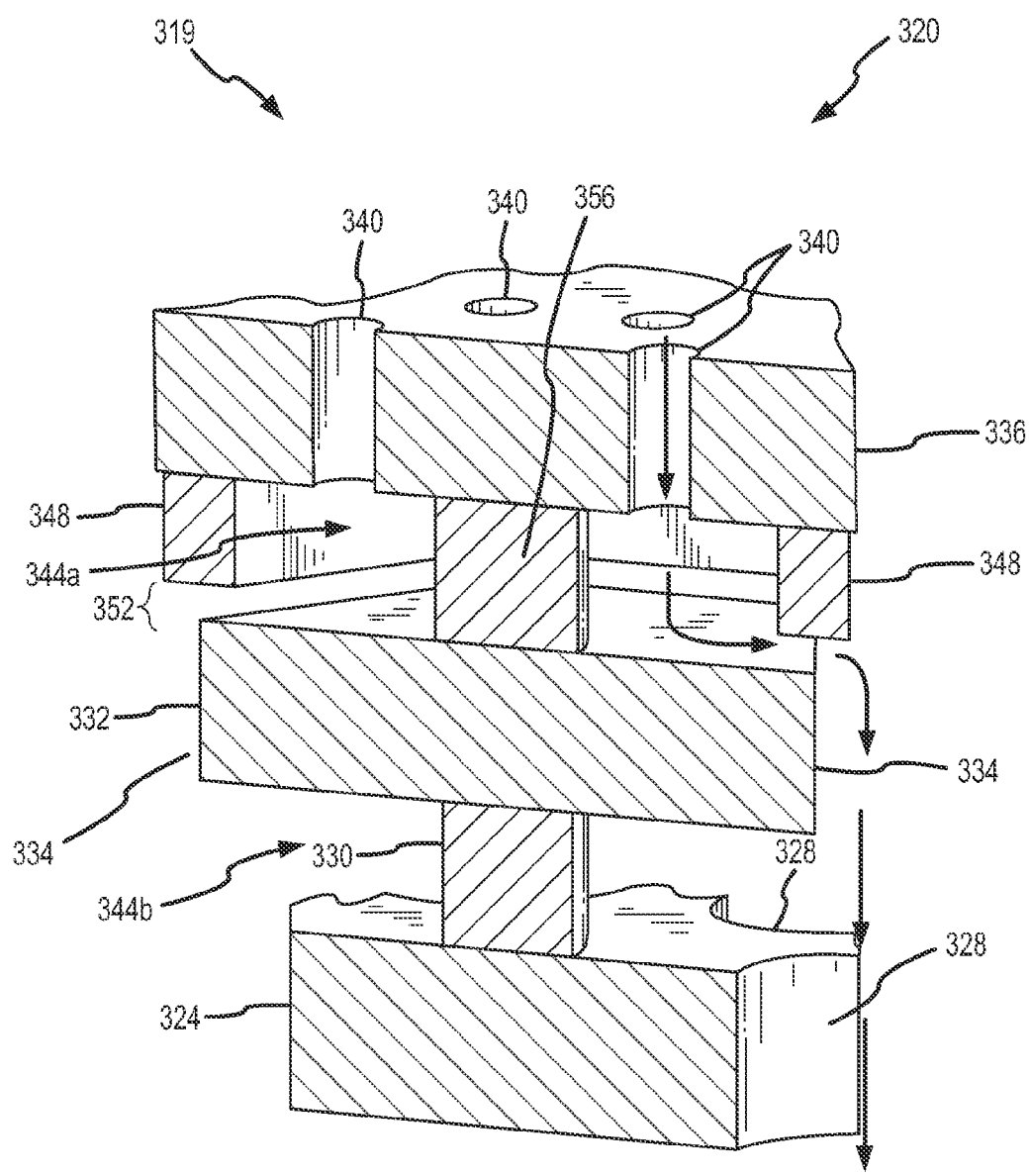
FIG. 9A is a perspective, cross-sectional view of another embodiment of a filtering region configuration that may be used throughout the filtering region of the MEMS filter module of FIG. 2A.
Figure 9B:
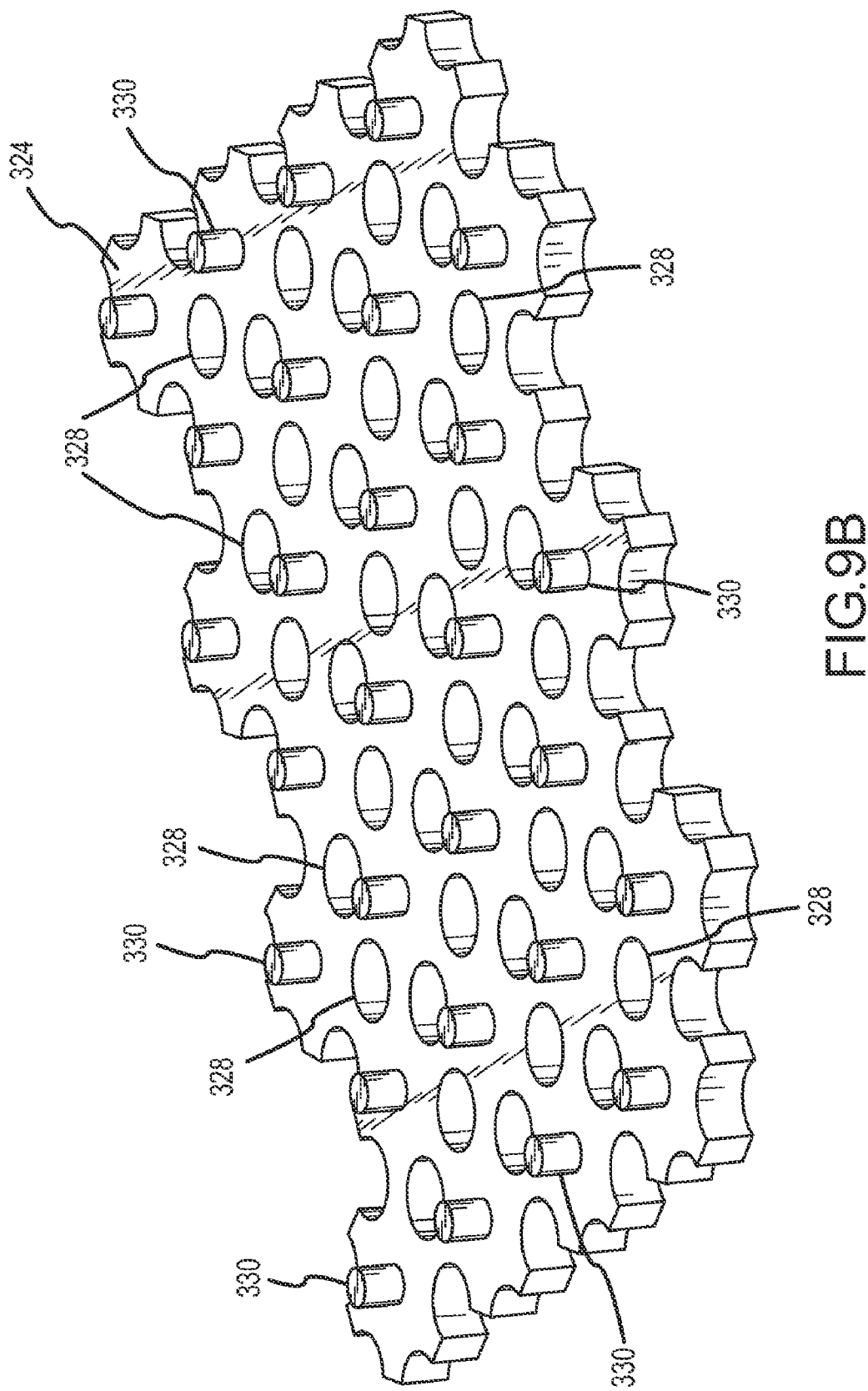
FIG. 9B is a perspective view of part of the lower film and the lower supports used by the filtering region configuration of FIG. 9A.
Figure 9C:
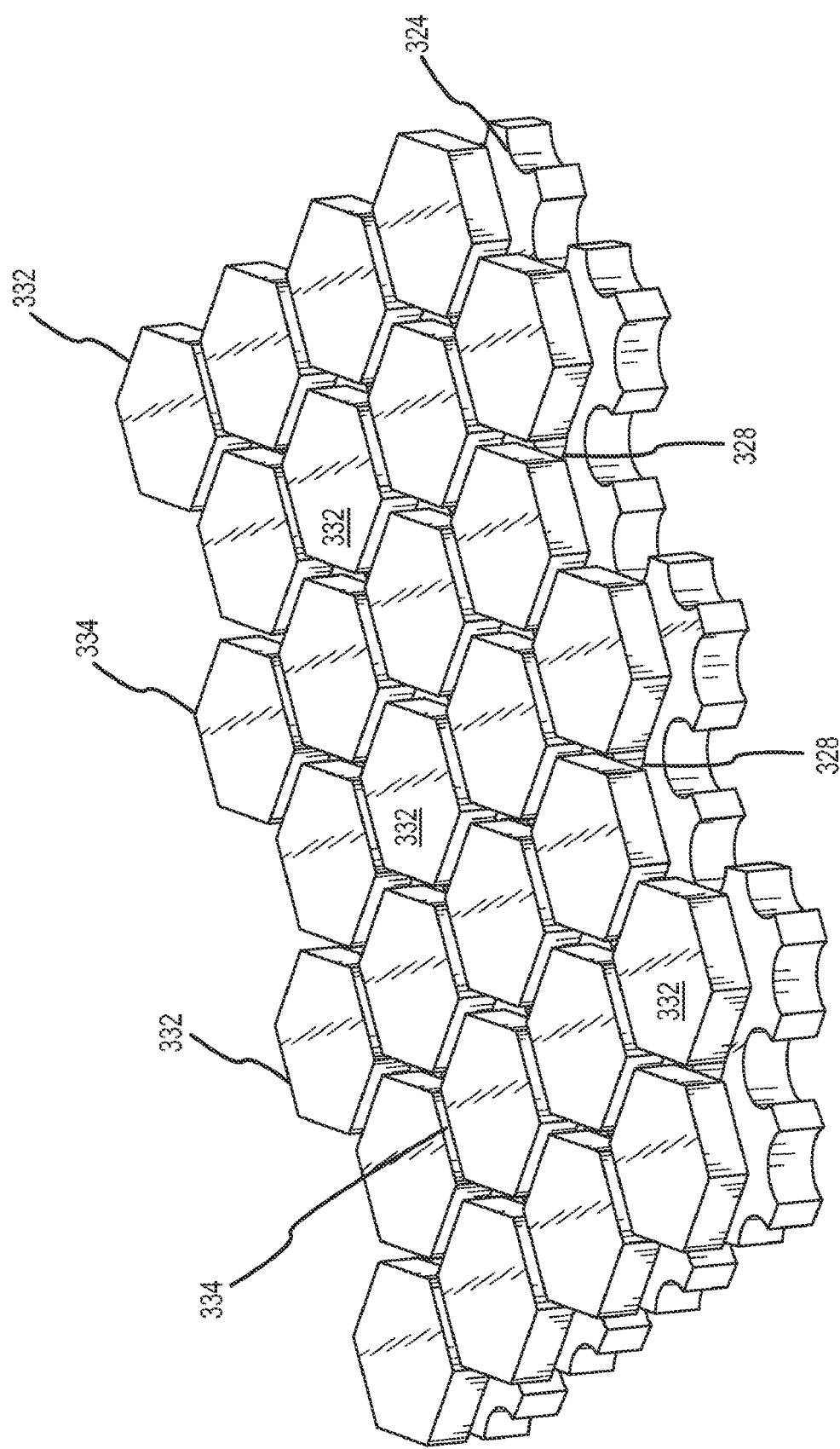
FIG. 9C is a perspective view of part of the second film sections positioned on the lower supports illustrated in FIG. 9B.
Figure 9E:
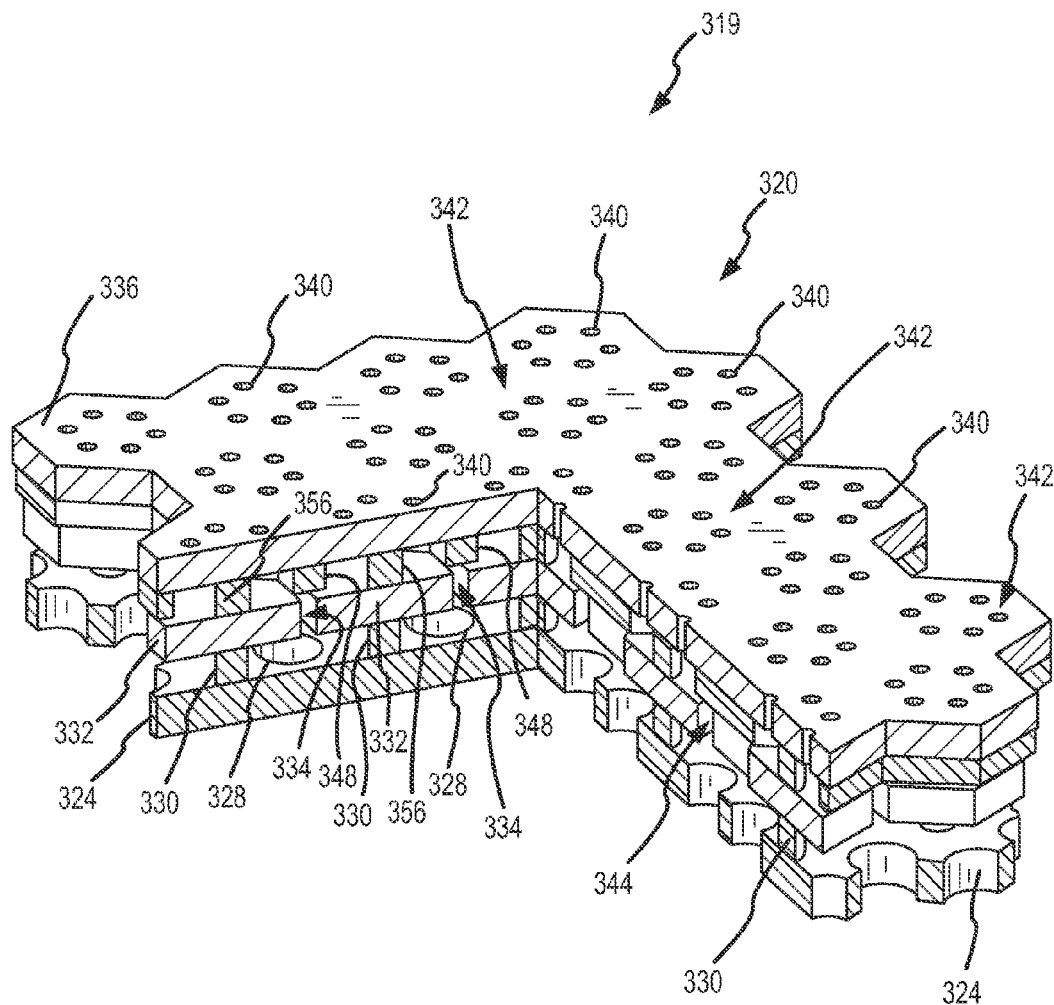
FIG. 9E is a perspective, cross-sectional view of additional portions of the filtering region configuration of FIG. 9A.

FIG. 4A identifies three separate, annular filter walls 150a, 150b, and 150c, while FIG. 4B identifies two separate, annular filter walls 150 for purposes of identifying interrelationships between the first flow ports 134, the second flow ports 142, and the filter walls 150. Generally, each first flow port 134 is disposed inwardly of an annular filter wall 150, while each second flow port 142 is disposed between the various annular filter walls 150.

A plurality of first flow ports 134 are fluidly interconnected with each filter trap chamber 148a (having a perimeter defined by a single filter wall 150), are disposed inwardly of their corresponding filter wall 150, and define a first flow port group 136. Any number of first flow ports 134 may be in each first flow port group 136, and the first flow ports 134 may be of any appropriate size and/or configuration (e.g., to accommodate the desired number/arrangement of supports 154 and the desired flow through the MEMS filter module 124). The filtering region 126 uses a plurality of first flow port groups 136. Each filter wall 150 thereby has a dedicated first flow port group 136. Providing multiple first flow ports 134 for each filter wall 150 reduces the impact of any particular first flow port 134 becoming plugged.

Although reducing the number of first flow ports 134 that are associated with a particular filter wall 150 may reduce the flow rate through the corresponding filter trap chamber 148a defined by this filter wall 150, it will not totally disable the filter wall 150 in relation to its filtering function, unless all of its associated first flow ports 134 become plugged.

The various second flow ports 142 associated with the second film 138 in the filtering region 126 are disposed in the space between the various filter walls 150 that interface with and extend from the second film 138. A plurality of second flow ports 142 are disposed outwardly of (beyond) and about each filter wall 150, and define a second flow port group 146. Any number of second flow ports 142 may be disposed about each filter wall 150, and the second flow ports 142 may be of any appropriate size and/or configuration (e.g., to accommodate the desired number/arrangement of supports 154 and the desired flow through the MEMS filter module 124). The filtering region 126 uses a plurality of second flow port groups 146. It should be appreciated that a given second flow port 142 may be associated with more than one second flow port group 146 in the case of the filtering region 126.

Each filter wall 150 is associated with multiple second flow ports 142. Providing multiple second flow ports 142 for each filter wall 150 reduces the impact of any particular second flow port 142 becoming plugged on a given filter wall 150. It should be appreciated that each second flow port group 146 used by the filtering region 126 in effect could be used to provide a flow to or receive a flow from any filter trap chamber 148a. That is, each second flow port 142 of a particular second flow port group 146 could become plugged, and a flow could still be received from or directed to the fluid trap chamber 148a of the associated filter wall 150 by other second flow ports 142, including one or more second flow ports 142 from a different second flow port group 146. Reducing the number of second flow ports 142 that are available may of course reduce the flow rate through the filter module 124.

Based upon the foregoing, it should be appreciated that the first flow ports 136, second flow ports 142, filter walls 150, and supports 154 are distributed throughout the filtering region 126 of the filter module 124 in a repeating pattern. One way to characterize this pattern is that the first flow port groups 136, filter walls 150, and certain of the supports 154 are disposed in a plurality of rows 158 and a plurality of columns 160, and a plurality of second flow ports 142 are disposed about the filter walls 150 in each row 158 in the same manner. These rows 158 are disposed in parallel relation and are also equally spaced, as are the columns 160. The rows 158 extend in a direction that is perpendicular to a direction that the columns 160 extend. Any number of rows 158 and columns 160 may be utilized in the filtering region 126. The first flow port groups 136 are equally spaced in each row 158 and column 160, and the same spacing between adjacent first flow port groups 136 is used in each row 158 and column 160. The filter walls 150 are also equally spaced in each row 158 and column 160, and the same spacing between adjacent filter walls 150 is used in each row 158 and column 160. The supports 154 are also equally spaced in each row 158 and column 160, and the same spacing between adjacent supports 154 is used in each row 158 and column 160.

There are also a plurality of rows 162 of supports 154 between each of the above-noted rows 158, and a plurality of columns 164 of supports 154 between each of the above-noted columns 160. These rows 162 are thereby disposed in parallel relation and are also equally spaced, as are the columns 164. The supports 154 are equally spaced in each row 162 and column 164. It should be appreciated that there may be instances where there are not complete repeats of the above-noted pattern in the filtering region 126.

FIGS. 5A–E illustrate one embodiment of a MEMS filter module 166 having a filtering region 170. The filter module 166 includes a first film 174 and a second film 184 that are disposed in spaced relation or at different elevations. Each of these films 174, 184 defines an extreme for the MEMS filter module 124 in both the filtering region 170 and in its perimeter region (not shown, but in accordance with the perimeter region 42 of the MEMS filter module 34 of FIGS. 2A–F). As such, the films 174, 184 would be interconnected and supported about their respective perimeter regions by each annular seal 66 used by the MEMS filter module 166. The films 174, 184 are thereby "continuous" structures in the same manner discussed above in relation to the films 70, 46.

The first film 174 includes a plurality of first flow ports 178, while the second film 184 includes a plurality of second flow ports 188. All of the first flow ports 178 and all of the second flow ports 188 are located only in the filtering region 170 of the filter module 166 (i.e., none are in the perimeter region 42). A plurality of supports 196 extend between and structurally interconnect the first film 174 and the second film 184 in the filtering region 170. These supports 196 are distributed throughout the filtering region 170 in a repeating pattern, are disposed in spaced relation to each other, and may be of any appropriate configuration. A plurality of filter walls 192 are attached to and extend from the second film 184 and at least toward (in the direction of) the first film 174. Any number of filter walls 192 may be utilized in the filtering region 170 of the MEMS filter module 166. Although any number of supports 196 may be utilized as well, the number and location of the supports 196 is subject to the characterizations discussed above in relation to the supports 78. The supports 196 are subject to a number of additional characterizations as well. One is that a single support 196 is positioned inwardly of each filter wall 192 in a central location. Another is that no supports 196 are disposed in the space between adjacent filter walls 192.

Each filter wall 192 has an annular configuration. "Annular" in this context means that each filter wall 192 has a closed perimeter when looking at the distal end of the filter wall 192 (that which is opposite the end of the filter wall 192 that interfaces with the second film 184). Stated another way, each filter wall 192 extends a full 360 degrees about a certain reference axis along any appropriate path. Although each filter wall 192 has a circular, annular extent in the illustrated embodiment, any configuration could be utilized for the filter wall 192 to realize the noted annular extent (e.g., rectangular, square, oval, triangular). Each filter wall 192 also does not extend all the way to the first film 174. Instead, a filter trap or filter trap gap 194 exists between the distal end of each filter wall 192 and the first film 174. Since each filter wall 192 is annular, its corresponding filter trap gap 194 will likewise be annular. Note that each filter wall 192 is also offset from the various first flow ports 178 and second flow ports 188, thereby inducing at least one change in direction for the flow through the MEMS filter module 166.

Flow may be directed through each filter trap gap 194 to provide a filtering function. Any constituent in the flow (e.g., particulates, cells of a certain size) that is larger than the height of a particular filter trap gap 194 will typically be collectively retained by the corresponding filter wall 192 and the first film 174 (i.e., by being unable to pass through the filter trap gap 194). Since each filter trap 194 is annular in the case of the MEMS filter module 166, any constituent that is "trapped" by being unable to pass through a particular filter trap gap 194 will then not totally "plug" the filter trap gap 194. Having an annular filter trap gap 194 associated with each filter wall 192 also provides a desired flow rate through the MEMS filter module 166. The number and location of the various supports 196 is preferably selected such that the height of each filter trap gap 194 throughout the filtering region 170 is maintained within a small tolerance for the maximum flow rate for which the filter module 170 is designed in the same manner discussed above in relation to the filter trap gap 58.

The flow may enter the MEMS filter module 166 either through the second flow ports 188 (in which case the flow out of the MEMS filter module 166 would be through the first flow ports 178), or through the first flow ports 178 (in which case the flow out of the MEMS filter module 166 would be through the second flow ports 188). In either case, the flow will be directed into either a space 190a or a space 190b that extends from the first film 174 to the second film 184 before attempting to pass through a filter trap gap 194 associated with a particular filter wall 192. Each of these spaces 190a, 190b in the filtering region 170 may be characterized as a filter trap chamber 190a, 190b. The height of each filter trap chamber 190a, 190b corresponds with the spacing between the first film 174 and the second film 184, which is greater than the height of the filter trap gap 194. Each annular filter wall 192 defines a filter trap chamber 190a, while the space between the various filter walls 192 defines a single filter trap chamber 190b.

The volume of each filter trap chamber 190a may be larger than the volume of any associated first flow port 178, while the volume of the filter trap chamber 190b may be larger than the volume of any associated second flow port 188, although such is not a requirement. Whether the flow enters the MEMS filter module 166 through the first flow ports 178 or the second flow ports 188, the flow will go through a filter trap chamber 190a or the filter trap chamber 190b, then through a filter trap gap 194, and then through the other of a filter trap chamber 190a or the filter trap chamber 190b. Specifically, a flow entering the MEMS filter module 166 through the second flow ports 188 will flow into the filter trap chamber 190b, through the corresponding filter trap gap 194, into the corresponding filter trap chamber 190a, and then out of the MEMS filter module 166 through the first flow ports 178. The reverse would be the case for a flow entering the MEMS filter module 166 through the first flow ports 178.

A plurality of first flow ports 178 are fluidly interconnected with each filter trap chamber 190a (having a perimeter defined by a single filter wall 192), are disposed inwardly of their corresponding filter wall 192, and define a first flow port group 182. Any number of first flow ports 178 may be in each first flow port group 182, and the first flow ports 178 may be of any appropriate size and/or configuration (e.g., to accommodate the desired number/arrangement of supports 196 and the desired flow through the MEMS filter module 166). The filtering region 170 uses a plurality of first flow port groups 182. Each filter wall 192 thereby has a dedicated first flow port group 182. Providing multiple first flow ports 178 for each filter wall 192 reduces the impact of any particular first flow port 178 becoming plugged. Although reducing the number of first flow ports 178 that are associated with a particular filter wall 192 may reduce the flow rate through the corresponding filter trap chamber 190a defined by this filter wall 192, it will not totally disable the filter wall 192 in relation to its filtering function, unless all of its associated first flow ports 178 become plugged.

The various second flow ports 188 associated with the second film 184 in the filtering region 170 are disposed in the space between the various filter walls 192 that interface with and extend from the second film 184. A plurality of second flow ports 188 are disposed outwardly of (beyond) and about each filter wall 192. In the illustrated embodiment, six second flow ports 188 are disposed about each filter wall 192, with one second flow port 188 being centrally disposed between each adjacent trio of filter walls 192. Any number of second flow ports 188 may be disposed about each filter wall 192, and the second flow ports 188 may be of any appropriate size and/or configuration (e.g., to accommodate the desired number/arrangement of supports 196 and the desired flow through the MEMS filter module 166). Each filter wall 192 is thereby also associated with multiple second flow ports 188. Providing multiple second flow ports 188 for each filter wall 192 reduces the impact of any particular second flow port 188 becoming plugged on a given filter wall 192. It should be appreciated that any particular second flow port 188 used by the filtering region 170 in effect could be used to provide a flow to or receive a flow from any filter trap chamber 190a. That is, each second flow port 188 disposed about a particular filter wall 192 could become plugged, and a flow could still be received from or directed to the corresponding filter trap chamber 190a about which this particular filter wall 192 is disposed. Reducing the number of second flow ports 188 that are available may of course reduce the flow rate through the MEMS filter module 166.

Based upon the foregoing, it should be appreciated that the first flow ports 178, second flow ports 188, filter walls 192, and supports 196 are distributed throughout the filtering region 170 of the MEMS filter module 166 in a repeating pattern. One way to characterize this pattern is that the first flow port groups 182, filter walls 192, and supports 196 are disposed in a plurality of rows 198, and a plurality of second flow ports 188 are disposed about the filter walls 192 in each row 198 in the same manner. These rows 198 are disposed in parallel relation and are also equally spaced. Any number of rows 198 may be utilized in the filtering region 170 (fours rows 198 in the illustrated embodiment). The first flow port groups 182 are equally spaced in each row 198, and the same spacing between adjacent first flow port groups 182 is used in each row 198. The filter walls 192 are also equally spaced in each row 198, and the same spacing between adjacent filter walls 192 is used in each row 198. The supports 196 are also equally spaced in each row 198, and the same spacing between adjacent support posts 196 is used in each row 198.

There is a "staggered" relation of the first flow port groups 182, filter walls 192, and supports 196 between adjacent rows 198. Specifically, each first flow port group 182 in one row 198 is disposed "midway" between adjacent pairs of first flow port groups 182 in an adjacent row 198, each filter wall 192 in one row 198 is disposed "midway" between adjacent pairs of filter walls 192 in an adjacent row 198, and each support 196 in one row 198 is disposed "midway" between adjacent pairs of supports 196 in an adjacent row 198. The first flow port groups 182, filter walls 192, and supports 196 in one row 198 also may be described as being 180 degrees "out-of-phase" with the first flow port groups 182, filter walls 192, and supports 196 in each adjacent row 198. It should be appreciated that there may be instances where there are not complete repeats of the above-noted pattern. Another option would be for the first flow port groups 182 and filter walls 192 to be disposed in a plurality of rows and in a plurality of columns, where the rows extend perpendicularly to the direction in which the columns extend (not illustrated, but similar to the pattern of the embodiment of FIGS. 4A–F), although the pattern illustrated in relation to FIGS. 5A–E increases the density of the filter walls 192 in the filtering region 170.

FIGS. 6A–D illustrate one embodiment of a MEMS filter module 200 having a filtering region 204. The MEMS filter module 200 includes a first film 208 and a second film 220 that are disposed in spaced relation or at different elevations. Each of these films 208, 220 defines an extreme for the MEMS filter module 200 in both the filtering region 204 and in its perimeter region (not shown, but in accordance with the perimeter region 42 of the MEMS filter module 34 of FIGS. 2A–F). As such, the films 208, 220 would be interconnected and supported about their respective perimeter regions by each annular seal 66 used by the MEMS filter module 200. The films 208, 220 are thereby "continuous" structures in the same manner discussed above in relation to the films 70, 46.

The first film 208 includes a plurality of first flow ports 212, while the second film 220 includes a plurality of second flow ports 224. Any number of first flow ports 212 and second flow ports 224 may be used, and these may be of any appropriate size and/or configuration (e.g., to accommodate the desired number/arrangement of supports 232 and the desired flow through the MEMS filter module 200). All of the first flow ports 212 and all of the second flow ports 224 are located only in the filtering region 204 of the MEMS filter module 200 (i.e., not in the perimeter region 42). A plurality of supports 232 extend between and structurally interconnect the first film 208 and the second film 220 in the filtering region 204. These supports 232 are distributed throughout the filtering region 204 in a repeating pattern, are disposed in spaced relation to each other, and may be of any appropriate configuration. A filter wall grid 227 is defined by a plurality of annular filter wall sections 228, and is attached to and extends from the second film 220 and at least toward (in the direction of) the first film 208. Any number of filter wall sections 228 may be utilized. Although any number of supports 232 may be utilized as well, the number and location of the support posts 232 is subject to the characterizations discussed above in relation to the supports 78. The supports 232 are subject to a number of additional characterizations as well. One is that either a single support 232 or a pair of supports 232 is positioned inwardly of each annular filter wall section 228. Another is that a single support 232 is disposed within each annular filter wall section 228 having either no second flow ports 224 enclosed thereby or a pair of second flow ports 224 enclosed thereby. Yet another is that a pair of supports 232 are disposed within each annular filter wall section 228 having a single second flow port 224 enclosed thereby.

Each filter wall section 228 has an annular configuration. "Annular" in this context means that each filter wall section 228 has a closed perimeter when looking at the distal end of the filter wall grid 227 (that which is opposite the end of the filter wall grid 227 that interfaces with the second film 220). Stated another way, each filter wall section 228 extends a full 360 degrees about a certain reference axis along any appropriate path. Although each filter wall section 228 has a rectangular, annular extent in the illustrated embodiment, any configuration could be utilized for the filter wall section 228 to realize the noted annular extent (e.g., square, circular, oval, triangular). The filter wall grid 227 (and thereby each annular filter wall section 228) also does not extend all the way to the first film 208. Instead, a filter trap or a filter trap gap 230 exists between the distal end of the filter wall grid 227 (and thereby each annular filter wall section 228) and the first film 208. Since each filter wall section 228 is annular, its corresponding filter trap 230 will likewise be annular. Note that each filter wall section 228 is also offset from the various first flow ports 212 and second flow ports 224, thereby inducing at least one change in direction for the flow through the MEMS filter module 200.

Flow may be directed through each filter trap gap 230 to provide a filtering function. Any constituent in the flow (e.g., particulates, cells of a certain size) that is larger than the height of a particular filter trap gap 230 will typically be collectively retained by the corresponding filter wall section 228 and the first film 208 (i.e., by being unable to pass through the filter trap gap 230). Since each filter trap 230 is annular in the case of the MEMS filter module 200, any constituent that is "trapped" by being unable to pass through a particular filter trap gap 230 will then not totally "plug" the filter trap gap 230. Having an annular filter trap gap 230 associated with each filter wall section 228 also provides a desired flow rate through the MEMS filter module 200. The number and location of the various supports 232 is preferably selected such that the height of each filter trap gap 230 throughout the filtering region 204 is maintained within a small tolerance for the maximum flow rate for which the MEMS filter module 200 is designed in the same manner discussed above in relation to the filter trap gap 58.

The flow may enter the MEMS filter module 200 either through the second flow ports 224 (in which case the flow out of the MEMS filter module 200 would be through the first flow ports 212 ), or through the first flow ports 212 (in which case the flow out of the filter module 200 would be through the second flow ports 224). In either case, the flow will be directed into a space 226 that extends from the first film 208 to the second film 220 before attempting to pass through a filter trap gap 230 associated with a particular filter wall section 228. Each of these spaces 226 in the filtering region 204 may be characterized as a filter trap chamber 226 and is bounded by an annular filter wall section 228. The height of each filter trap chamber 226 corresponds with the spacing between the first film 208 and the second film 220, which is greater than the height of the corresponding filter trap gap 230. The volume of each filter trap chamber 226 may be larger than the volume of any associated first flow port 212, and further may be larger than the volume of any associated second flow port 224, although such is not a requirement. Whether the flow enters the MEMS filter module 200 through the first flow ports 212 or the second flow ports 224, the flow will go through a filter trap chamber 226, then through a filter trap gap 230, and then through another filter trap chamber 226. Since each annular filter wall section 228 is the same size in the case of the MEMS filter module 200, the perimeter or outer boundary of each filter trap chamber 226 is likewise the same.

The plurality of first flow ports 212 are arranged relative to the plurality of second flow ports 224 such that there will be either at least one first flow port 212 associated with a particular filter trap chamber 226, or at least one second flow port 224 associated with the same filter trap chamber 226. That is, no filter trap chamber 226 will have both one or more first flow ports 212 and one or more second flow ports 224 associated therewith. In the case where a particular filter trap chamber 226 does not have a first flow port 212 associated therewith (where the projection of the associated filter wall section 228 onto the first film 208 does not encompass any first flow port 212), there will be either a single second flow port 224 associated therewith or a pair of second flow ports 224 associated therewith, depending upon the number of supports 232 (if a single support 232 is located in the filter trap chamber 226, one second flow port 224 will be disposed on each side thereof; if a pair of supports 232 are located in the filter trap chamber 226, a single second flow port 224 will extend therebetween). In the case where a particular filter trap chamber 226 does not have a second flow port 224 associated therewith (where the associated filter wall section 228 does not encompass any second flow port 224), there will be either a single first flow port 212 associated therewith or a pair of first flow ports 212 associated therewith, depending upon the number of supports 232 (if a single support 232 is located in the filter trap chamber 226, one first flow port 212 will be disposed on each side thereof; if a pair of supports 232 are located in the filter trap chamber 226, a single first flow port 212 will extend therebetween). The first flow ports 212 and second flow ports 224 are each elongate, such that a single constituent trapped therein should not totally plug the same.

Based upon the foregoing, it should be appreciated that the first flow ports 212, second flow ports 224, filter walls sections 228, and supports 232 are distributed throughout the filtering region 204 of the MEMS filter module 200 in a repeating pattern. One way to characterize this pattern is that the first flow ports 212, second flow ports 224, filter wall sections 228, and supports 232 are disposed in a plurality of rows 234 and columns 236. The rows 234 are disposed in parallel relation to each other, as are the columns 236. Any number of rows 234 and columns 236 may be utilized in the filtering region 204. The pattern in the individual rows 234 is that the number of supports 232 alternates between one and two across the row 234 (i.e., one column 236 in a particular row 234 will have a single support 232, while the adjacent columns 236 in the same row will each have two supports 232). The pattern in the individual columns 236 is that the number of supports 232 alternates between one and two proceeding within the column 236, going by pairs of rows 234 (i.e., in each column 236, there will be two rows 234 each having a single support 232, followed by two rows 234 each having a pair of supports 232). It should be appreciated that there may be instances where there are not complete repeats of this pattern.

FIGS. 7A–E illustrate one embodiment of a MEMS filter module 237 having a filtering region 238. The filter module 237 includes a first film 242 and a second film 250 that are disposed in spaced relation or at different elevations (only those portion of the films 242, 250 required to show a single filter wall 262 of the MEMS filter module 237 being shown). Each of these films 242, 250 defines an extreme for the MEMS filter module 237 in both the filtering region 238 and in its perimeter region (not shown, but in accordance with the perimeter region 42 of the MEMS filter module 34 of FIGS. 2A–F). As such, the films 242, 250 would be interconnected and supported about their respective perimeter regions by each annular seal 66 used by the filter module 237. The films 242, 250 are thereby "continuous" structures in the same manner discussed above in relation to the films 70, 46.

At least one, and typically a plurality of, filter walls 262 is attached to and extends from the second film 250 and at least toward (in the direction of) the first film 242. Any number of filter walls 262 may be utilized in the filtering region 238 of the filter module 237. The first film 242 includes a first flow port group 248 for each filter wall 262 (each in turn having a plurality of first flow ports 246), while the second film 250 includes a second flow port group 256 (each in turn having a plurality of second flow ports 254). All of the first flow ports 246 and all of the second flow ports 254 are located only in the filtering region 238 of the filter module 237 (i.e., none are in the perimeter region 42). A first support 270 is associated with each filter wall 262, and extends between and structurally interconnects the first film 242 and the second film 250 at a location that is inward of its corresponding filter wall 262. An annular support 276 (of any "annular" configuration) is also associated with each filter wall 262 as well, and extends between and structurally interconnects the first film 242 and the second film 250 outward of (beyond) and about its corresponding filter wall 262. As such, a single annular support 276 is preferably concentrically disposed about its corresponding filter wall 262, while a single first support 270 may be centrally disposed relative to both its corresponding annular support 276 and filter wall 262. It may be possible to use only the annular support 276 for each filter wall 262, instead of using both an annular support 276 and first support 270 for each filter wall 262.

Each filter wall 262 has an annular configuration. "Annular" in this context means that each filter wall 262 has a closed perimeter when looking at the distal end of the filter wall 262 (that which is opposite the end of the filter wall 262 that interfaces with the second film 250). Stated another way, each filter wall 262 extends a full 360 degrees about a certain reference axis along any appropriate path. Although each filter wall 262 has a circular, annular extent in the illustrated embodiment, any configuration could be utilized for the filter wall 262 to realize the noted annular extent (e.g., rectangular, square, oval, triangular). Each filter wall 262 also does not extend all the way to the first film 242. Instead, a filter trap or filter trap gap 266 exists between the distal end of each filter wall 262 and the first film 242. Since each filter wall 262 is annular, its corresponding filter trap gap 266 will likewise be annular. Note that each filter wall 262 is also offset from the various first flow ports 246 and second flow ports 254, thereby inducing at least one change in direction for the flow through the MEMS filter module 237.

Flow may be directed through each filter trap gap 266 to provide a filtering function. Any constituent in the flow (e.g., particulates, cells of a certain size) that is larger than the height of a particular filter trap gap 266 will typically be collectively retained by the corresponding filter wall 262 and the first film 242 (i.e., being unable to pass through the filter trap gap 266). Since each filter trap gap 266 is annular in the case of the MEMS filter module 237, any constituent that is "trapped" by being unable to pass through a particular filter trap gap 266 will then not totally "plug" the filter trap gap 266. Having an annular filter trap gap 266 associated with each filter wall 262 also provides a desired flow rate through the MEMS filter module 237. The number and location of the various first supports 270 and their corresponding annular support 276 is preferably selected such that the height of each filter trap gap 266 throughout the filtering region 238 is maintained within a small tolerance for the maximum flow rate for which the filter module 237 is designed in the same manner discussed above in relation to the filter trap gap 58.

The flow may enter the MEMS filter module 237 either through the second flow port group(s) 256 (in which case the flow out of the MEMS filter module 237 would be through the first flow port group(s) 248), or through the first flow port group(s) 248 (in which case the flow out of the MEMS filter module 237 would be through the second flow port group(s) 256). In either case, the flow will be directed into either a space 258a or a space 258b that extends from the first film 242 to the second film 250 before attempting to pass through a filter trap gap 266 associated with a particular filter wall 262. Each of these spaces 258a, 258b in the filtering region 238 may be characterized as a filter trap chamber 258a or a filter trap chamber 258b. The height of each filter trap chamber 258a, 258b corresponds with the spacing between the first film 242 and the second film 250, which is greater than the height of its corresponding filter trap gap 266. The volume of each filter trap chamber 258a may be larger than the volume of each first flow port 246 in its corresponding first flow port group 248, while the volume of each filter trap chamber 258b may be larger than the volume of each second flow port 254 in its corresponding second flow port group 256, although such is not a requirement. The filter trap chamber 258a is in direct fluid communication with its corresponding first flow port group 248, while the filter trap chamber 258b is in direct fluid communication with its corresponding second flow port group 256. Therefore, whether the flow enters the MEMS filter module 237 through a first flow port group(s) 248 or a second flow port group(s) 256, the flow will go through one filter trap chamber 258a or 258b, then through a filter trap gap 266, and then through the other corresponding filter trap chamber 258a or 258b.

A plurality of first flow ports 246 are fluidly interconnected with each filter trap chamber 258a, and define a first flow port group 248. Any number of first flow ports 246 may be in each first flow port group 248, and the first flow ports 246 may be of any appropriate size and/or configuration (e.g., to accommodate the desired number/arrangement of supports 270, 276 and the desired flow through the MEMS filter module 237). The filtering region 238 again will typically use a plurality of first flow port groups 248. Each filter wall 262 thereby has a dedicated first flow port group 248. Providing multiple first flow ports 246 for each filter wall 262 reduces the impact of any particular first flow port 246 becoming plugged. Although reducing the number of first flow ports 246 that are associated with a particular filter wall 262 may reduce the flow rate through the corresponding filter trap chamber 258a, it will not totally disable the filter wall 262 in relation to its filtering function, unless all of its associated first flow ports 246 become plugged.

A plurality of second flow ports 254 are fluidly interconnected with each filter trap chamber 258b, and define a second flow port group 256. Any number of second flow ports 254 may be in each second flow port group 256, and the second flow ports 254 may be of any appropriate size and/or configuration (e.g., to accommodate the desired number/arrangement of supports 270, 276 and the desired flow through the MEMS filter module 237). The filtering region 238 again will typically use a plurality of second flow port groups 254. Each filter wall 262 thereby has a dedicated second flow port group 256. Providing multiple second flow ports 254 for each filter wall 262 reduces the impact of any particular second flow port 254 becoming plugged. Although reducing the number of second flow ports 254 that are associated with a particular filter wall 262 may reduce the flow rate through the corresponding filter trap chamber 258b, it will not totally disable the filter wall 262 in relation to its filtering function, unless all of its associated second flow ports 254 become plugged.

Typically a plurality of filter walls 262, its corresponding first support 270, its corresponding annular support 276, first flow port group 248, and second flow port group 256 will be distributed throughout the filtering region 238 of the MEMS filter module 237 in an appropriate repeating pattern. One such pattern is that used by the MEMS filter module 166 of FIGS. 5A–E (where the filtering region 238 would use a plurality of parallel rows, each having a plurality of equally spaced filter walls 262, but where the filter walls 262 of adjacent rows would be staggered or 180 degrees out of phase with the filter walls 262 in any adjacent row(s)). Another such pattern is that used by the MEMS filter module 124 of FIGS. 4A–E (where the filtering region 238 would use a plurality of parallel rows each having a plurality of equally spaced filter walls 262, as well as a plurality of parallel columns each having a plurality of equally spaced filter walls 262, with the rows extending perpendicularly relative to the columns).

FIGS. 8A–D illustrate one embodiment of a MEMS filter module 278 having a filtering region 280. The MEMS filter module 278 includes a first film 284 and a second film 296 that are disposed in spaced relation or at different elevations. Each of these films 284, 296 defines an extreme for the MEMS filter module 278 in both the filtering region 280 and in its perimeter region (not shown, but in accordance with the perimeter region 42 of the MEMS filter module 34 of FIGS. 2A–F). As such, the films 284, 296 would be interconnected and supported about their respective perimeter regions by each annular seal 66 used by the MEMS filter module 278. The films 284, 296 are thereby "continuous" structures in the same manner discussed above in relation to the films 70, 46.

The first film 284 includes a plurality of first flow ports 288, while the second film 296 includes a plurality of second flow ports 300. Any number of first flow ports 288 and second flow ports 300 may be utilized, and the same may be of any appropriate size and/or configuration (e.g., to accommodate the desired number/arrangement of supports 316 and the desired flow through the MEMS filter module 278). All of the first flow ports 288 and all of the second flow ports 300 are located only in the filtering region 280 of the filter module 278 (i.e., none are in the perimeter region 42). A plurality of supports 316 extend between and structurally interconnect the first film 284 and the second film 296 in the filtering region 280. These supports 316 are distributed throughout the filtering region 280 in a repeating pattern, are disposed in spaced relation to each other, and may be of any appropriate configuration. A filter wall grid 306 is defined by a plurality of annular filter wall sections 308, and is attached to and extends from the second film 296 and at least toward (in the direction of) the first film 284. Any number of filter wall sections 308 may be utilized. Although any number of supports 316 may be utilized as well, the number and location of the supports 316 is subject to the characterizations discussed above in relation to the supports 78. The supports 316 are subject to a number of additional characterizations as well. One is that either a single support 316 or a pair of support posts 316 is positioned inwardly of each annular filter wall section 308. Another is that a single support 316 is disposed within each annular filter wall section 308 having a pair of second flow ports 300 enclosed thereby and no first flow ports 288 included in an area defined by the projection of the annular filter wall section 308 onto the first film 284. Another is that a pair of supports 316 are disposed within each annular filter wall section 308 having no second flow port 300 enclosed thereby and a pair of first flow ports 288 included in an area defined by the projection of the annular filter wall section 308 onto the first film 284.

Each filter wall section 308 has an annular configuration. "Annular" in this context means that each filter wall section 308 has a closed perimeter when looking at the distal end of the filter wall grid 306 (that which is opposite the end of the filter wall grid 306 that interfaces with the second film 296). Stated another way, each filter wall section 308 extends a full 360 degrees about a certain reference axis along any appropriate path. Although each filter wall section 308 has a rectangular, annular extent in the illustrated embodiment, any configuration could be utilized for the filter wall section 308 to realize the noted annular extent (e.g., square, circular, oval, triangular). The filter wall grid 306 (and thereby each annular filter wall section 308) also does not extend all the way to the first film 284. Instead, a filter trap or a filter trap gap 312 exists between the distal end of the filter wall grid 306 (and thereby each annular filter wall section 308) and the first film 284. Since each filter wall section 308 is annular, its corresponding filter trap 312 will likewise be annular. Note that each filter wall section 308 is also offset from the various first flow ports 288 and second flow ports 300, thereby inducing at least one change in direction for the flow through the MEMS filter module 278.

Flow may be directed through each filter trap gap 312 to provide a filtering function. Any constituent in the flow (e.g., particulates, cells of a certain size) that is larger than the height of a particular filter trap gap 312 will typically be collectively retained by the corresponding filter wall section 308 and the first film 284 (i.e., being unable to pass through the filter trap gap 312). Since each filter trap gap 312 is annular in the case of the MEMS filter module 278, any constituent that is "trapped" by being unable to pass through a particular filter trap gap 312 will then not totally "plug" the filter trap gap 312. Having an annular filter trap gap 312 associated with each filter wall section 308 also provides a desired flow rate through the MEMS filter module 278. The number and location of the various supports 316 is preferably selected such that the height of each filter trap gap 312 throughout the filtering region 280 is maintained within a small tolerance for the maximum flow rate for which the MEMS filter module 278 is designed in the same manner discussed above in relation to the filter trap gap 58.

The flow may enter the MEMS filter module 278 either through the second flow ports 300 (in which case the flow out of the MEMS filter module 278 would be through the first flow ports 288), or through the first flow ports 288 (in which case the flow out of the MEMS filter module 278 would be through the second flow ports 300). In either case, the flow will be directed into a space 304 that extends from the first film 284 to the second film 296 before attempting to pass through a filter trap gap 312 associated with a particular filter wall section 308. Each of these spaces 304 in the filtering region 280 may be characterized as a filter trap chamber 304 and is bounded by an annular filter wall section 308. The height of each filter trap chamber 304 corresponds with the spacing between the first film 284 and the second film 296, which is greater than the height of the filter trap gap 312. The volume of each filter trap chamber 304 may be larger than the volume of any associated first flow port 288, and further may be larger than the volume of any associated second flow port 300, although such is not a requirement. Whether the flow enters the MEMS filter module 278 through the first flow ports 288 or the second flow ports 300, the flow will go through a filter trap chamber 304, then through a filter trap gap 312, and then through another filter trap chamber 304. Since each annular filter wall section 308 is the same size in the case of the filter module 278, the perimeter or outer boundary of each filter trap chamber 304 is likewise the same.

The plurality of first flow ports 288 are arranged relative to the plurality of second flow ports 300 such that there will be either at least one first flow port 288 associated with a particular filter trap chamber 304, or at least one second flow port 300 associated with the same filter trap chamber 304. That is, no filter trap chamber 304 will have both one or more first flow ports 288 and one or more second flow ports 300 associated therewith (see FIGS. 8C and 8D, where section $S_1$ of the filter wall grid 306 is identified for a frame of reference in each of FIGS. 8C–8D). In the case where a particular filter trap chamber 304 does not have a first flow port 288 associated therewith (where the projection of the associated filter wall section 308 onto the first film 284 does not encompass any first flow port 288), there will be a pair of second flow ports 300 associated therewith in the illustrated embodiment. In the case where a particular filter trap chamber 304 does not have a second flow port 300 associated therewith (where the associated filter wall section 308 does not encompass any second flow port 300), there will be a pair of first flow ports 288 associated therewith in the illustrated embodiment (where the projection of the associated filter wall section 308 onto the first film 284 encompasses a pair of first flow ports 288). The first flow ports 288 and second flow ports 300 are each elongate, such that a single constituent trapped therein should not totally plug the same.

Based upon the foregoing, it should be appreciated that the first flow ports 288, second flow ports 300, filter walls sections 308, and support posts 316 are distributed throughout the filtering region 280 of the filter module 278 in a repeating pattern. One way to characterize this pattern is that the first flow ports 288, second flow ports 300, filter wall sections 308, and supports 316 are disposed in a plurality of rows 317 and columns 318, with the columns 318 extending perpendicularly to the direction in which the rows 317 extend. The rows 317 are disposed in parallel relation to each other, as are the columns 318. Any number of rows 317 and columns 318 may be utilized in the filtering region 280. The pattern in the individual rows 317 is that: 1) the same number of first flow ports 288, second flow ports 300, and supports 316 is the same for each annular filter wall section 308 in the row 317; and 2) the rows 317 alternate by having either a pair of supports 316, a pair of second flow ports 300, and no first flow ports 288 for each annular filter wall section 308, or a single support post 316, no second flow ports 300, and a pair of first flow ports 288 for each annular filter wall section 308. It should be appreciated that there may be instances where there are not complete repeats of the above-noted pattern.

FIGS. 9A–E illustrate one embodiment of a MEMS filter module 319 having a filtering region 320. The filter module 319 includes a first film 324, a plurality of second film sections 332, and a third film 336 that are disposed in spaced relation or at different elevations, with the plurality of second film sections 332 being located at an intermediate elevation between the first film 324 and the third film 336. The first film 324 and the third film 336 define an extreme for the filter module 319 in both the filtering region 320 and in its perimeter region (not shown, but in accordance with the perimeter region 42 of the MEMS filter module 34 of FIGS. 2A–F). As such, the films 324, 336 would be interconnected and supported about their respective perimeter regions by each annular seal 66 used by the filter module 166. The films 324, 336 are thereby "continuous" structures in the same manner discussed above in relation to the films 70, 46. The plurality of second film sections 332 in the illustrated embodiment, on the other hand, do not define a continuous structure (i.e., there is an annular gap (second flow passage 334) about each second film section 332). Adjacent second film sections 332 could be structurally interconnected by one or more links (not shown), but in a manner to accommodate the desired flow through the MEMS filter module 319. In this case, multiple flow passages would be provided about each second film section 332.

The first film 324 includes a plurality of first flow ports 328, each of the plurality of second film sections 332 has an annular second flow passage 334 disposed thereabout, and the third film 336 includes a plurality of third flow ports 340. All of the first flow ports 328, all of the second flow passages 334, and all of the third flow ports 340 are located only in the filtering region 320 of the MEMS filter module 319 (i.e., none are in the perimeter region 42). A lower support 330 extends between and structurally interconnects the first film 324 and each individual second film section 332 in the filtering region 320. These lower supports 330 are distributed throughout the filtering region 320 in a repeating pattern, are disposed in spaced relation to each other, and may be of any appropriate configuration. An upper support 356 extends between and structurally interconnects the third film 336 and each individual second film section 332 in the filtering region 320. These upper supports 356 are distributed throughout the filtering region 320 in a repeating pattern, are disposed in spaced relation to each other, and may be of any appropriate configuration.

A plurality of filter walls 348 are attached to and extend from the third film 336 and at least toward (in the direction of) the corresponding second film section 332. That is, there is a one-to-one relation between the filter walls 348 and the second film sections 332 (i.e., each filter wall 348 is associated with a separate second film section 332). Any number of filter walls 348 (and thereby second film sections 332) may be utilized in the filtering region 320 of the filter module 319. Although any number of supports 330, 356 may be utilized as well, the number and location of the supports 330, 356 is subject to the characterizations discussed above in relation to the supports 78. The supports 330, 356 are subject to a number of additional characterizations as well. One is that a single upper support 356 is positioned inwardly of each filter wall 348 in a central location, and a single lower support 330 is axially aligned with each upper support 356 so as to be centrally disposed relative to the filter wall 348 as well.

Each filter wall 348 has an annular configuration. "Annular" in this context means that each filter wall 348 has a closed perimeter when looking at the distal end of the filter wall 348 (that which is opposite the end of the filter wall 348 that interfaces with the third film 336). Stated another way, each filter wall 348 extends a full 360 degrees about a certain reference axis along any appropriate path. Although each filter wall 348 has a hexagonal, annular extent in the illustrated embodiment, any configuration could be utilized for the filter wall 348 to realize the noted annular extent (e.g., rectangular, square, oval, triangular). Each filter wall 348 also does not extend all the way to its corresponding second film section 332. Instead, a filter trap or filter trap gap 352 exists between the distal end of each filter wall 348 and its corresponding second film section 332. Since each filter wall 348 is annular, its corresponding filter trap gap 352 will likewise be annular. Note that each filter wall 348 is also offset from the various first flow ports 328, thereby inducing at least one change in direction for the flow through the MEMS filter module 319.

Flow may be directed through each filter trap gap 352 to provide a filtering function. Any constituent in the flow (e.g., particulates, cells of a certain size) that is larger than the height of a particular filter trap gap 352 will typically be collectively retained by the corresponding filter wall 348 and the second film section 332 (i.e., being unable to pass through the filter trap gap 352). Since each filter trap 352 is annular in the case of the MEMS filter module 319, any constituent that is "trapped" by being unable to pass through a particular filter trap gap 352 will then not totally "plug" the filter trap gap 352. Having an annular filter trap gap 352 associated with each filter wall 348 also provides a desired flow rate through the MEMS filter module 319. The number and location of the various supports 330, 356 is preferably selected such that the height of each filter trap gap 352 throughout the filtering region 320 is maintained within a small tolerance for the maximum flow rate for which the MEMS filter module 319 is designed in the same manner discussed above in relation to the filter trap gap 58.

The flow may enter the filter module 319 either through the third flow ports 340 (in which case the flow out of the MEMS filter module 319 would be through the first flow ports 328), or through the first flow ports 328 (in which case the flow out of the filter module 319 would be through the third flow ports 340). In either case, the flow will be directed into either a space 344a or a space 344b before attempting to pass through a filter trap gap 352 associated with a particular filter wall 348. Each of these spaces 344a, 344b in the filtering region 320 may be characterized as a filter trap chamber 344a, 344b. The height of each filter trap chamber 344a corresponds with the spacing between the third film 336 and its corresponding second film section 332 (and bounded by a particular filter wall 348), which is greater than the height of the associated filter trap gap 352. The height of the filter trap chamber 344b corresponds with the spacing between the first film 324 and the various second film section 332, which is greater than the height of any of the filter trap gaps 352 as well. The volume of each filter trap chamber 344a may be larger than the volume of any associated third flow port 340, while the volume of the filter trap chamber 344b may be larger than the volume of any associated first flow port 328, although such is not a requirement. Whether the flow enters the filter module 319 through the first flow ports 328 or the third flow ports 340, the flow will go through either the filter trap chambers 344a or the filter trap chamber 344b, then through the corresponding filter trap gap 352, and then through the other the other of the filter trap chamber 344a or the filter trap chamber 344b.

A plurality of third flow ports 340 are fluidly interconnected with each filter trap chamber 344a. Any number of third flow ports 340 may be utilized, and the third flow ports 340 may be of any appropriate size and/or configuration (e.g., to accommodate the desired number/arrangement of supports 356 and the desired flow through the MEMS filter module 319). The filtering region 320 uses a plurality of third flow port groups 342. Each filter wall 348 thereby has a dedicated third flow port group 342. Providing multiple third flow ports 340 for each filter wall 348 reduces the impact of any particular third flow port 340 becoming plugged. Although reducing the number of third flow ports 340 that are associated with a particular filter wall 348 may reduce the flow rate through the corresponding filter trap chamber 344a defined by this filter wall 348, it will not totally disable the filter wall 348 in relation to its filtering function, unless all of its associated third flow ports 340 become plugged.

An annular second flow passage 334 is disposed about each second film section 332. Having an annular second flow passage 334 for each filter wall 348 reduces the impact of a portion of this annular second flow passage 334 becoming plugged, although it may of course have an effect on the flow rate through the filter module 319. In addition, each annular second flow passage 334 is not dedicated to a specific filter trap chamber 344a. Therefore, the entirety of a particular annular second flow passage 334 could become plugged, without disabling in the corresponding filter trap gap 352. Again, the plugging of an entire second flow passage 334 could have an effect on the flow rate through the filter module 319.

Each filter wall 348 is also associated with multiple first flow ports 328. Any number of first flow ports 328 may be utilized, and the first flow ports 328 may be of any appropriate size and/or configuration (e.g., to accommodate the desired number/arrangement of supports 330 and the desired flow through the MEMS filter module 319).Providing multiple first flow ports 328 for each filter wall 348 reduces the impact of any particular first flow port 328 becoming plugged on a given filter wall 348. It should be appreciated that any particular first flow port 328 used by the filtering region 320 in effect could be used to provide a flow to or receive a flow from any filter trap chamber 344a. Reducing the number of first flow ports 328 that are available may of course reduce the flow rate through the MEMS filter module 319.

Based upon the foregoing, it should be appreciated that the first flow ports 328, annular second flow passages 334, filter walls 348, and support posts 330, 356 are distributed throughout the filtering region 320 of the filter module 319 in a repeating pattern that is in accordance with the pattern used in the filtering region 170 for the filter module 166 of FIGS. 5A–E. Therefore, the above-noted discussion regarding this pattern is equally applicable to the filtering region 320 of the filter module 319 of FIGS. 9A–E. In one embodiment, the MEMS filter module 319 may be modified so as to not utilize the first film 324 and the various lower supports 330 (not shown).

Figure 10A:
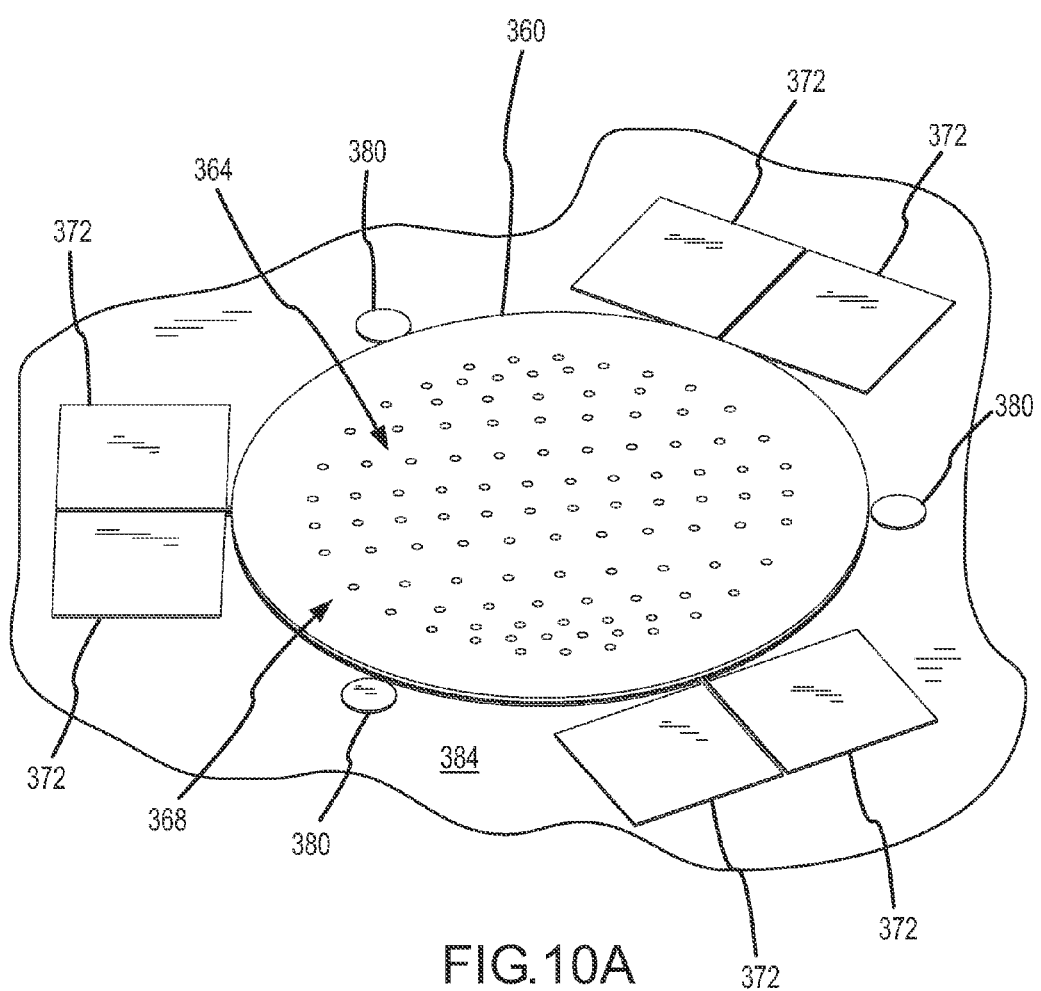
FIG. 10A is a perspective view of one embodiment of an interface between a MEMS filter module and a substrate on which the MEMS filter module is fabricated.
Figure 10B:
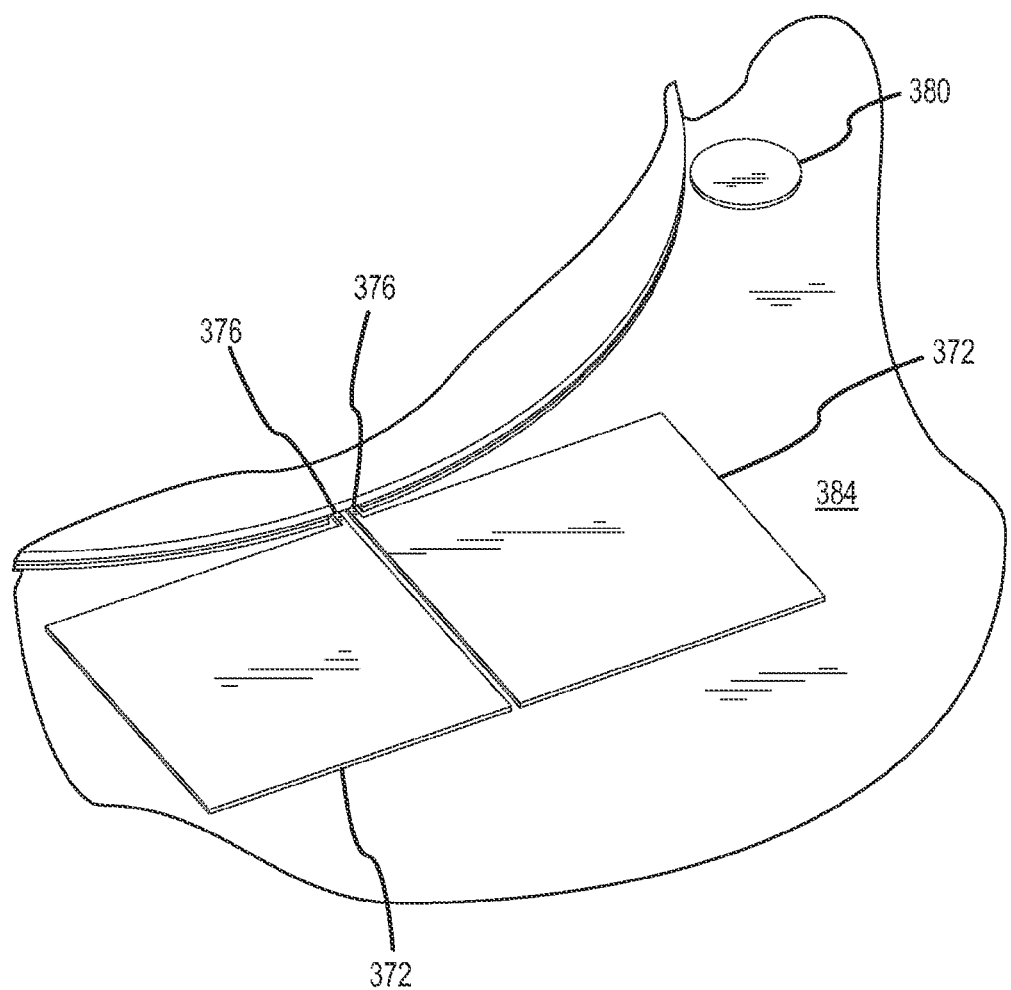
FIG. 10B is an enlarged, perspective view of one of the lateral motion constraints and the links used to support the MEMS filter module of FIG. 10A above the substrate.

Each of the various MEMS filter modules described herein may be fabricated by surface micromachining as previously noted and as generally described above in relation to FIGS. 3A–I. The MEMS filter module need not be structurally interconnected with the underlying substrate other than by an underlying layer of sacrificial material. Removal of this sacrificial material in the etch release at the end of fabrication will thereby separate the MEMS filter module from the substrate. Another option would be for the lowest film of the MEMS filter module being fabricated to remain disposed in spaced relation to the substrate after the etch release (e.g., FIG. 31). That is, the MEMS filter module may be supported above the substrate in an appropriate manner. One way in which this may be done is illustrated in FIGS. 10A–B. A MEMS filter module 360 of the type described herein includes a filtering region 364 and a perimeter region 368. This MEMS filter module 360 is supported above a substrate 384. In this regard, a plurality of bond pads 372 are anchored to the substrate 384, extend upwardly from the substrate 384, and are disposed beyond a perimeter of the MEMS filter module 360. A link 376 extends from each bond pad 372 to the MEMS filter module 360. Each link 376 may be of any appropriate configuration and may be disposed at any appropriate elevation relative to the substrate 384. The links 376 thereby suspend the MEMS filter module 360 above the substrate 384. When it is desired to remove the MEMS filter module 360 from the substrate 384, the bond pads 372 are contacted by appropriate electrodes. The resulting electrical signal fractures each link 376, and as such the MEMS filter module 360 "falls" onto the substrate 384. A plurality of motion limiters 380 are anchored to the substrate 384, extend upwardly therefrom, and are disposed about the MEMS filter module 360 to constrain the motion of the MEMS filter module 360 in the lateral dimension once positioned directly on the substrate 384. The motion limiters 380 may be of any appropriate configuration. The MEMS filter module 360 may then be retrieved from the substrate 384 in any appropriate way (e.g., by moving the MEMS filter module 360 at least principally in the vertical dimension and away from the substrate 384).

Figure 11A:
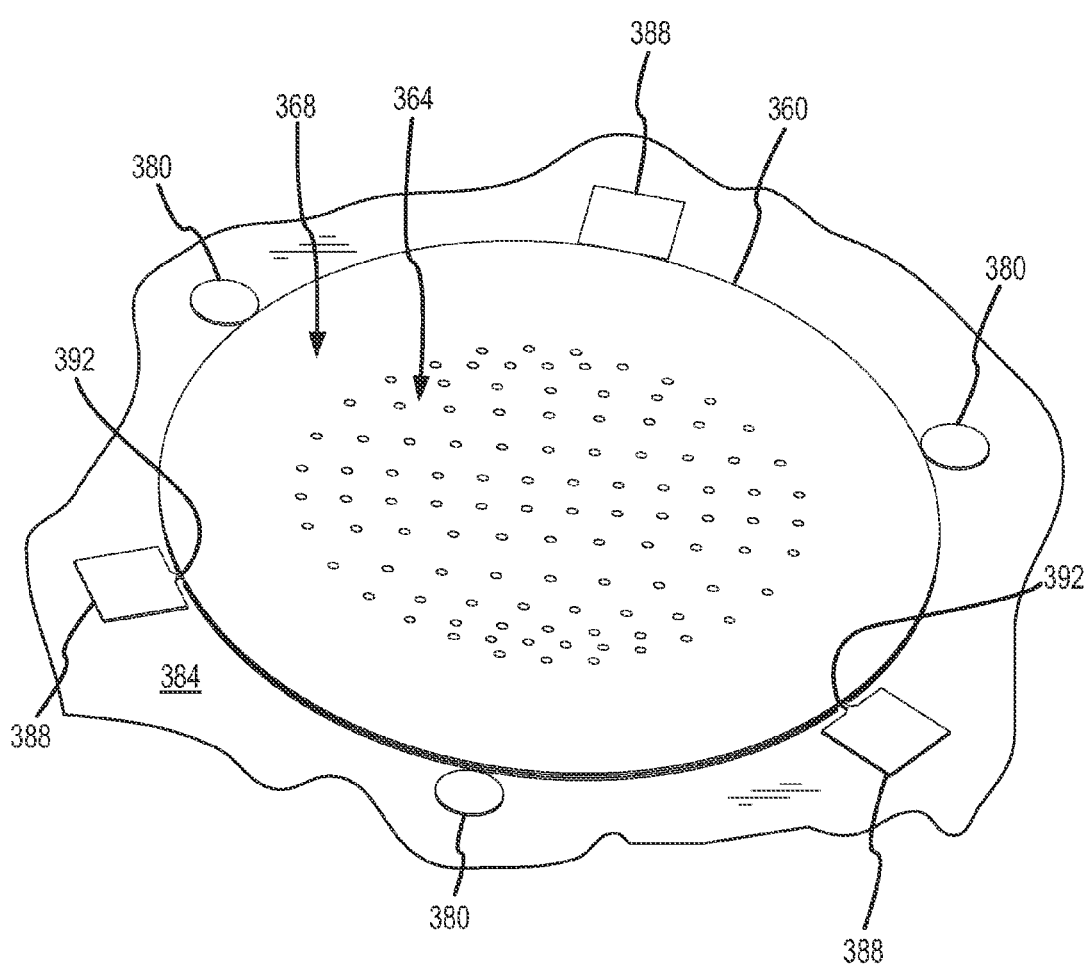
FIG. 11A is a perspective view of another embodiment of an interface between a MEMS filter module and a substrate on which the MEMS filter module is fabricated.
Figure 11B:
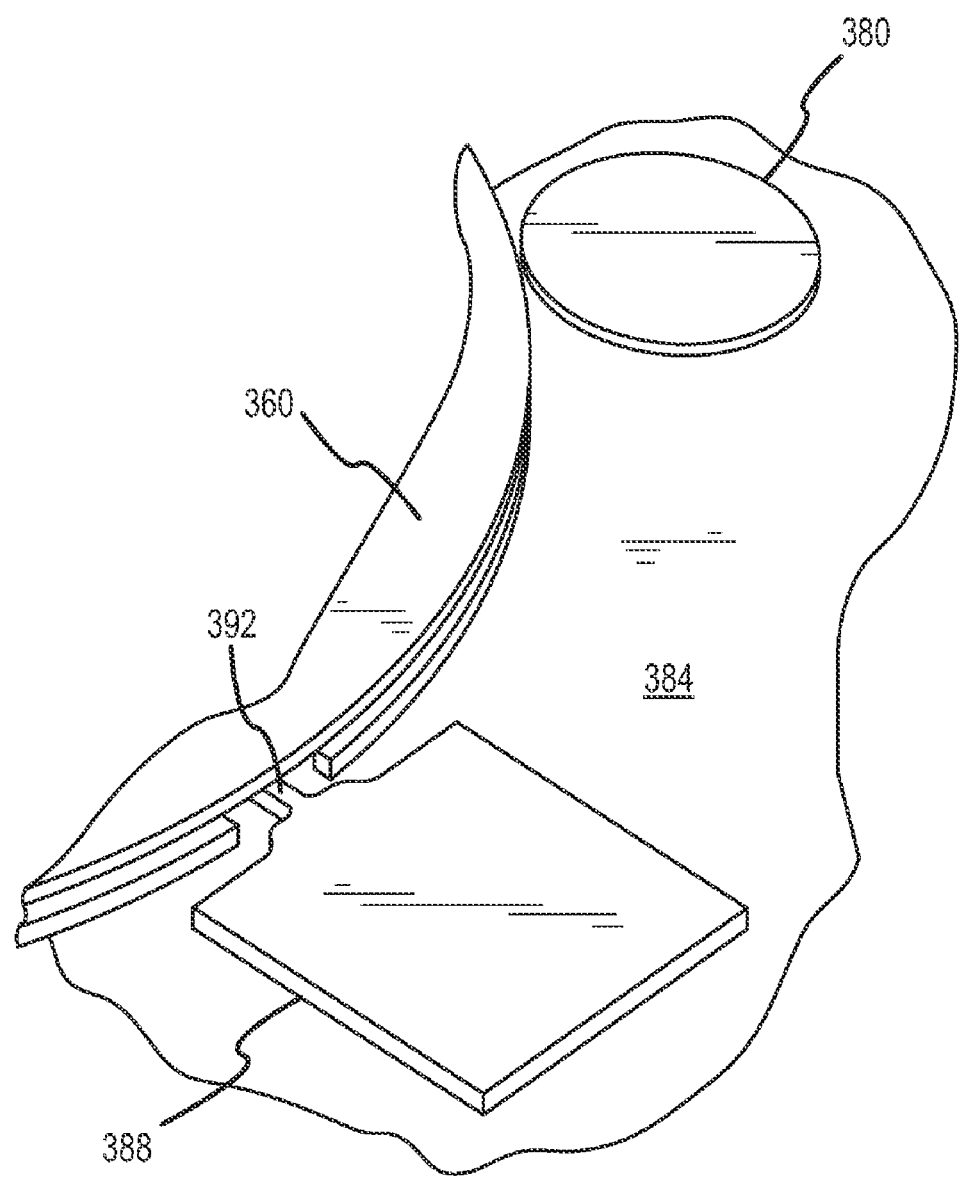
FIG. 11B is an enlarged, perspective view of one of the lateral motion constraints and the links used to support the MEMS filter module of FIG. 11A above the substrate.

FIGS. 11A–B present another option for supporting the MEMS filter module 360 above the substrate 384 after the etch release. In this case, a plurality of filter module anchors 388 are fabricated on and extend outwardly from the substrate 384 at a location so as to be disposed about a perimeter of the MEMS filter module 360. These filter module anchors 388 may be in any appropriate configuration. A link 392 extends from each filter module anchor 388 to the MEMS filter module 360. The links 392 may be of any appropriate configuration and may be disposed at appropriate elevation above the substrate 384. When it is desired to remove the MEMS filter module 360 from the substrate 384, an appropriate force may be exerted on the MEMS filter module 360 (e.g., one that is at least generally orthogonal to the underlying substrate 384). This force will fracture each link 392, and as such the MEMS filter module 360 may "fall" onto the substrate 384. A plurality of motion limiters 380 again are anchored to the substrate 384 and are disposed about the MEMS filter module 360 to constrain the motion of the MEMS filter module 360 in the lateral dimension once on the substrate 384. The filter module 360 may then be retrieved from the substrate 384 in any appropriate way (e.g., by moving the MEMS filter module 360 at least principally in the vertical dimension and away from the substrate 384).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A filter module, comprising: a first film comprising a plurality of first flow ports; a second film comprising a plurality of second flow ports, wherein said second film is spaced from said first film; a plurality of filter walls that are disposed in spaced relation on said second film, that extend from said second film toward said first film, and that are of an annular extent in a plan view of a surface of said second film from which said plurality of filter walls extend, wherein a gap between each said filter wall and said first film defines a filter trap that is thereby also of an annular extent; a first annular seal extending between said first and second films; a filtering region bounded by said first annular seal, wherein all of said filter walls, said filter traps, said first flow ports, and said second flow ports are located in said filtering region; and a plurality of supports extending between said first and second films in said filtering region.

2. A filter module, as claimed in claim 1, wherein: said first film and said second film each have a maximum thickness of about 10 microns.

3. A filter module, as claimed in claim 1, wherein: said first and second films define opposing extremes of said filter module.

4. A filter module, as claimed in claim 1, further comprising: a first chamber fluidly connected with at least one of said first flow ports; and a second chamber fluidly connected with at least one of said second flow ports, wherein said filter trap fluidly interconnects said first and second chambers.

5. A filter module, as claimed in claim 1, wherein: each of said plurality of filter walls may be of any shape in said plan view to define said annular extent of said plurality of filter walls.

6. A filter module, as claimed in claim 1, wherein: each of said plurality of filter walls terminates prior to reaching a surface of said first film that faces said second film.

7. A filter module, as claimed in claim 1, wherein: an area defined by projecting each of said plurality of filter walls onto said first film fails to encompass any of said first flow ports.

8. A filter module, as claimed in claim 1, wherein: a number of said supports is no less than a number of said filter walls.

9. A filter module, as claimed in claim 1, wherein: at least two said first flow ports and at least two said second flow ports are associated with each said filter trap.

10. A filter module, as claimed in claim 1, wherein: a height of each said gap is about 0.3 microns.

11. A filter module, as claimed in claim 1, further comprising: a second annular seal extending between said first and second films and disposed in spaced relation to said first annular seal, wherein said second annular seal is disposed outwardly of said first annular seal.

12. A filter comprising the filter module of claim 1 in a filter housing.

13. A filter module, comprising: a first film comprising a plurality of first flow ports; a second film comprising a plurality of second flow ports, wherein said second film is spaced from said first film; a plurality of filter walls that are disposed in spaced relation on said second film and that extend from said second film toward said first film, wherein a gap between each said filter wall and said first film defines a filter trap; a first annular seal extending between said first and second films; a filtering region bounded by said first annular seal, wherein all of said filter walls, said filter traps, said first flow ports, and said second flow ports are located in said filtering region; and a plurality of supports extending between said first and second films in said filtering region, wherein a number of said supports is no less than a number of said filter walls.

14. A filter module, as claimed in claim 13, wherein: said first film and said second film each have a maximum thickness of about 10 microns.

15. A filter module, as claimed in claim 13, wherein: said first and second films define opposing extremes of said filter module.

16. A filter module, as claimed in claim 13, further comprising: a first chamber fluidly connected with at least one of said first flow ports; and a second chamber fluidly connected with at least one of said second flow ports, wherein said filter trap fluidly interconnects said first and second chambers.

17. A filter module, as claimed in claim 13, wherein: each of said plurality of filter walls terminates prior to reaching a surface of said first film that faces said second film.

18. A filter module, as claimed in claim 13, wherein: an area defined by projecting each of said plurality of filter walls onto said first film fails to encompass any of said first flow ports.

19. A filter module, as claimed in claim 13, wherein: at least two said first flow ports and at least two said second flow ports are associated with each said filter trap.

20. A filter module, as claimed in claim 13, wherein: a height of each said gap is about 0.3 microns.

21. A filter module, as claimed in claim 13, further comprising: a second annular seal extending between said first and second films and disposed in spaced relation to said first annular seal, wherein said second annular seal is disposed outwardly of said first annular seal.

22. A filter comprising the filter module of claim 13 in a filter housing.

23. A filter module, comprising: a first film comprising a plurality of first flow ports; a second film comprising a plurality of second flow ports, wherein said second film is spaced from said first film; a plurality of filter walls that are disposed in spaced relation on said second film and that extend from said second film toward said first film, wherein a gap between each said filter wall and said first film defines a filter trap, wherein at least two said first flow ports and at least two said second flow ports are associated with each said filter trap; a first annular seal extending between said first and second films; a filtering region bounded by said first annular seal, wherein all of said filter walls, said filter traps, said first flow ports, and said second flow ports are located in said filtering region; and; a plurality of supports extending between said first and second films.

24. A filter module, as claimed in claim 23, wherein: said first film and said second film each have a maximum thickness of about 10 microns.

25. A filter module, as claimed in claim 23, wherein: said first and second films define opposing extremes of said filter module.

26. A filter module, as claimed in claim 23, further comprising: a first chamber fluidly connected with at least one of said first flow ports; and a second chamber fluidly connected with at least one of said second flow ports, wherein said filter trap fluidly interconnects said first and second chambers.

27. A filter module, as claimed in claim 23, wherein: each of said plurality of filter walls are of an annular extent in a plan view of a surface of said second film from which said plurality of filter walls extend, wherein each said filter trap that is thereby also of an annular extent.

28. A filter module, as claimed in claim 27, wherein: each of said plurality of filter walls may be of any shape in said plan view to define said annular extent of said plurality of filter walls.

29. A filter module, as claimed in claim 23, wherein: each of said plurality of filter walls terminates prior to reaching a surface of said first film that faces said second film.

30. A filter module, as claimed in claim 23, wherein: an area defined by projecting each of said plurality of filter walls onto said first film fails to encompass any of said first flow ports.

31. A filter module, as claimed in claim 23, wherein: a number of said supports is no less than a number of said filter walls.

32. A filter module, as claimed in claim 23, wherein: a height of each said gap is about 0.3 microns.

33. A filter module, as claimed in claim 23, further comprising: a second annular seal extending between said first and second films and disposed in spaced relation to said first annular seal, wherein said second annular seal is disposed outwardly of said first annular seal.

34. A filter comprising the filter module of claim 23 in a filter housing.

35. A filter module, comprising: a first film comprising a plurality of first flow ports that extend through said first film; a first chamber fluidly connected with at least one of said first flow ports; a second film comprising a plurality of second flow ports that extend through said second film, wherein said second film is spaced from said first film; a second chamber fluidly connected with at least one of said second flow ports; a first filter wall that extends from said second film in a direction of said first film, wherein said first and second chambers are disposed on opposite sides of said first filter wall; a first filter trap defined in part by said first filter wall, wherein said first filter trap fluidly interconnects said first and second chambers; and a first annular seal extending between said first and second films.

36. A filter module, as claimed in claim 35, wherein: said first and second films each have a maximum thickness of about 10 microns.

37. A filter module, as claimed in claim 35, wherein: said first and second films define opposing extremes of said filter module.

38. A filter module, as claimed in claim 35, wherein: said first filter wall is of an annular extent in a plan view of a surface of said second film from which first filter wall extends.

39. A filter module, as claimed in 38, wherein: said first filter wall may be of any shape in said plan view to define said annular extent of said first filter wall.

40. A filter module, as claimed in claim 35, wherein: each of said plurality of filter walls terminates prior to reaching a surface of said first film that faces said second film.

41. A filter module, as claimed in claim 35, wherein: an area defined by projecting each of said plurality of filter walls onto said first film fails to encompass any of said first flow ports.

42. A filter module, as claimed in claim 35, farther comprising: at least one support associated with said first filter wall that extends between said first and second films.

43. A filter module, as claimed in claim 35, wherein: a number of said supports is no less than a number of said filter walls.

44. A filter module, as claimed in claim 35, wherein: at least two said first flow ports and at least two said second flow ports are associated with said first filter trap.

45. A filter module, as claimed in claim 35, wherein: a height of each said gap is about 0.3 microns.

46. A filter module, as claimed in claim 35, farther comprising: a second annular seal extending between said first and second films and disposed in spaced relation to said first annular seal, wherein said second annular seal is disposed outwardly of said first annular seal.

47. A filter comprising the filter module of claim 37 in a filter housing.

* * * * *